US008326288B2

(12) United States Patent
Yoo et al.

(10) Patent No.: US 8,326,288 B2
(45) Date of Patent: Dec. 4, 2012

(54) METHOD AND APPARATUS FOR PROVIDING VIRTUAL MOBILE PHONE NUMBER

(75) Inventors: Yong-kyu Yoo, Seoul (KR); Ji-woong Han, Seoul (KR)

(73) Assignee: KT Corporation, Kyeonggi-Do (KR)

( * ) Notice: Subject to any disclaimer, the term of this patent is extended or adjusted under 35 U.S.C. 154(b) by 1477 days.

(21) Appl. No.: 11/813,766

(22) PCT Filed: Jan. 5, 2006

(86) PCT No.: PCT/KR2006/000045
§ 371 (c)(1),
(2), (4) Date: Jul. 11, 2007

(87) PCT Pub. No.: WO2006/075853
PCT Pub. Date: Jul. 20, 2006

(65) Prior Publication Data
US 2008/0081617 A1    Apr. 3, 2008

(30) Foreign Application Priority Data

Jan. 11, 2005  (KR) .................. 10-2005-0002678
Jan. 11, 2005  (KR) .................. 10-2005-0002679
Jan. 11, 2005  (KR) .................. 10-2005-0002680

(51) Int. Cl.
*G06F 15/16* (2006.01)
(52) U.S. Cl. ..................................... 455/433; 455/435.1
(58) Field of Classification Search ............... 455/414.1, 455/433, 435.1
See application file for complete search history.

(56) References Cited

U.S. PATENT DOCUMENTS

2004/0198355 A1* 10/2004 Kim et al. ................. 455/435.1
2005/0277407 A1* 12/2005 Ahn et al. ................. 455/414.1

FOREIGN PATENT DOCUMENTS

| KR | 10-2002-0060382 | 7/2002 |
| KR | 10-2002-0077761 | 10/2002 |
| WO | WO99/29125 | 6/1999 |

OTHER PUBLICATIONS

WIPO, International Search Report for PCT/KR2006/000045.
International Search Report, mailing date Apr. 17, 2006, for corresponding International Application No. PCT/KR2006/000045.
Japanese Office Action, mailing date Jun. 8, 2010, for corresponding Japanese Application No. 2007-549278.
Korean Office Action, mailing date May 26, 2006, for corresponding Korean Application No. 10-2005-0002678.
Korean Office Action, mailing date May 26, 2006, for corresponding Korean Application No. 10-2005-0002679.
Korean Office Action, mailing date May 26, 2006, for corresponding Korean Application No. 10-2005-0002680.

* cited by examiner

*Primary Examiner* — Sam Bhattacharya
(74) *Attorney, Agent, or Firm* — Sughrue Mion, PLLC

(57) ABSTRACT

The present invention relates generally to a method and apparatus for providing a virtual mobile phone number, and, more particularly, to a method and apparatus for requesting routing information, such as an actual phone number from a home location register storing the actual phone number corresponding to a virtual phone number transmitted from an originating terminal and transmitting a short message, a long message or a multimedia message to a terminating terminal corresponding to the actual phone number.

31 Claims, 13 Drawing Sheets

METHOD AND APPARATUS FOR PROVIDING VIRTUAL MOBILE PHONE NUMBER

CROSS-REFERENCE TO RELATED APPLICATIONS

This application is a U.S. National Phase application, under 35 U.S.C. §371, of International Application PCT/KR2006/000045, with an international filing date of Jan. 5, 2006 and claims priority to Korean application nos. 10-2005-0002678, 10-2005-0002679, and 10-2005-0002680, all filed Jan. 11, 2005; all of which are hereby incorporated by reference.

BACKGROUND OF THE INVENTION

1. Field of Invention

The present invention relates generally to a method and apparatus for providing virtual mobile phone numbers.

2. Background Art

With the rapid development of mobile communication systems, there are cases in which phone numbers assigned to mobile communication terminals are inevitably disclosed. Particularly, in an environment, such as the Internet, where many unspecified persons freely share information, the disclosure of the phone numbers results in telemarketing calls and short messages that are a kind of spam, which eventually becomes a factor that considerably invades persons' privacies.

In order to resolve this problem, a service of assigning two phone numbers to a single terminal was proposed. However, this service has a problem in that increased load on a home location register is generated because two phone numbers are assigned to a single terminal. In order to provide this service, specialized numbers other than numbers which are assigned to general terminals must be assigned, so that there is a restriction due to the limitation of numeric resources.

As a result, a system which allows users to use virtual phone numbers for the case where users do not want to reveal their own information, or an additional purpose, such as the reception of messages, and enables numbers assigned to general terminals to be used, without causing a load on various mobile communication network resources, such as a home location register, is required.

SUMMARY OF THE INVENTION

Technical Problem

Accordingly, the present invention has been made keeping in mind the above problems occurring in the prior art, and an object of the present invention is to provide a method and apparatus for providing virtual mobile phone numbers for messages, such as short messages, long messages or multimedia messages, which enable phone numbers assigned to general terminals to be used without causing a load on the resources of a mobile communication network.

Technical Solution

In order to accomplish the above objects, the present invention provides a method of providing a virtual phone number service in a value added service server, the value added service server being associated with a mobile communication network including a message service center and a home location register, the method comprising the steps of: receiving a message signal including an actual phone number corresponding to a virtual phone number from the message service center, wherein the message service center receives a message signal transmitted using the virtual phone number from an originating terminal and requests routing information for the virtual phone number to the home location register, the message signal is transmitted from the message service center based on a routing information response signal received from the home location register, the routing information signal including the previously stored actual phone number corresponding to the virtual phone number; altering the message signal; and transmitting the altered message signal to the message service center, wherein the message service center, having received the altered message signal, requests routing information for the actual phone number to the home location register, the home location register, having received a request for the routing information, transmits routing information for the actual phone number to the message service center, and the message service center, having received the routing information, transmits the message signal to a terminating terminal based on the routing information.

In a preferred embodiment, the home location register may have actual phone number data previously stored corresponding to virtual phone numbers.

Furthermore, the step of altering the message signal may be performed by indicating that the message is associated with a virtual phone number service in the message.

Furthermore, the method may further comprises the step of the message service center transmitting status information to the value added service server, and the value added service server, having received the status information, generating accounting information corresponding to the service.

Another aspect of the present invention provides a method of providing a virtual phone number service in a home location register, the home location register being associated with a mobile communication network including a message service center, the method comprising the steps of: receiving a routing information request for a virtual phone number used in message transmission by an originating terminal from the message service center; transmitting a routing information response signal including a previously stored actual phone number corresponding to the virtual phone number to a short message service center in response to the routing information request signal; receiving a routing information request for the actual phone number from the message service center; and transmitting a routing information response signal for the actual phone number to the message service center, wherein the message service center, having received the routing information response signal, transmits the message signal to a terminating terminal using this routing information response signal.

Another aspect of the present invention provides a method of providing a virtual phone number service in a message service center, the message service center being associated with a mobile communication network including a home location register and a value added service server, the method comprising the steps of: receiving a message signal transmitted by an originating terminal using a virtual phone number; transmitting a routing information request for the virtual phone number to the home location register; receiving a routing information response signal, including a previously stored actual phone number corresponding to the virtual phone number, from the home location register; transmitting the message signal, including the actual phone number corresponding to the virtual phone number, to the value added service server; receiving the altered message signal from the value added service server, wherein altered message signal is altered from the message signal received from the message service center by the value added service server; transmitting a routing information request for the actual phone number to the home location register; receiving a routing information response signal for the actual phone number from the home location register; and transmitting the altered message signal to a terminating terminal based on the routing information response signal.

Another aspect of the present invention provides a method of providing a virtual phone number service in a value added service server, the value added service server being associated with a mobile communication network including an originating mobile switching center for managing at least one mobile communication terminal, a terminating mobile switching center, a first short message service center, a second short message service center, a first home location register and a second home location register, the method comprising the steps of: receiving a short message signal including an actual phone number corresponding to a virtual phone number and a message signal from the first short message service center, wherein the originating mobile switching center transmits the short message signal using the virtual phone number to the first short message service center, the first short message service center, having received the short message signal, requests routing information for the virtual phone number to the first home location register, the first home location register transmits a routing information response signal including a previously stored actual phone number corresponding to the virtual phone number in response to the routing information signal to the first short message service center, and the first short message service center, having received the routing information response signal, transmits the short message signal; altering the short message signal; and transmitting the altered short message signal to the second short message service center, wherein the second short message service center, having received the altered short message signal, requests routing information for the actual phone number to the second home location register, the second home location register, having received a request for the routing information, transmits the routing information for the actual phone number to the second message service center, and the second message service center, having received the routing information, transmits the short message signal to the terminating mobile switching center based on the routing information.

In a preferred embodiment, the first home location register may have actual phone number data previously stored corresponding to virtual phone numbers.

Furthermore, the step of altering the short message signal may be performed by indicating that the short message is associated with a virtual phone number service in the short message.

Furthermore, the method may further comprises the step of the second message service center transmitting status information to the value added service server, and the value added service server, having received the status information, generating accounting information corresponding to the service.

Another aspect of the present invention provides a method of providing a virtual phone number service in a value added service server, the value added service server being associated with a mobile communication network including an originating mobile switching center for managing at least one mobile communication terminal, a terminating mobile switching center, a short message service center, and a home location register, the method comprising the steps of: receiving a short message signal including an actual phone number corresponding to a virtual phone number and a message signal from the first short message service center, wherein the originating mobile switching center transmits the short message signal using the virtual phone number to the short message service center, the short message service center, having received the short message signal, requests routing information for the virtual phone number to the home location register, the home location register transmits a routing information response signal including a previously stored actual phone number corresponding to the virtual phone number to the short message service center in response to the routing information signal, and the first short message service center, having received the routing information response signal, transmits the short message signal; altering the short message signal; and transmitting the altered short message signal to the short message service center, wherein the message service center, having received the altered short message signal, requests routing information for the actual phone number to the home location register, the home location register, having received a request for the routing information, transmits the routing information for the actual phone number to the message service center, and the short message service center, having receiving the routing information, transmits the short message signal to the terminating mobile switching center.

In a preferred embodiment, the home location register may have actual phone number data previously stored corresponding to virtual phone numbers.

Furthermore, the step of altering the short message signal may be performed by indicating that the short message is associated with a virtual phone number service in the short message.

Furthermore, the method may further comprises the step of the short message service center transmitting status information to the value added service server, and the value added service server, having received the status information, generating accounting information corresponding to the service.

Another aspect of the present invention provides a method of providing a virtual phone number service in a mobile switching center for managing at least one mobile communication terminal, the mobile switching center being associated with a mobile communication network including a home location register and a subscriber management system, the method comprising the steps of: receiving a voice call for a virtual phone number from an originating terminal; requesting routing information of the voice call for the virtual phone number to the home location register; receiving a routing information signal from the home location register, wherein the home location register requests information about the virtual phone number to the subscriber management system, the subscriber management system, having received a request signal, determines whether subscription to a virtual phone number service has been made and whether subscription to an additional voice service has been made for the virtual phone number, the routing information signal includes information indicating this when the subscription to a virtual phone number service has been made and the subscription to an additional voice service has not been made; and transmitting a message indicating that the voice call can not be made to the originating terminal if the routing information signal includes information indicating that subscription to an additional voice service has not been made.

Another aspect of the present invention provides a value added service server for providing a virtual phone number service, the value added service server being associated with a mobile communication network including an originating mobile switching center for managing at least one mobile communication terminal, a terminating mobile switching center, a first short message service center, a second short message service center, a first home location register, and a second home location register, the value added service server comprising: means for receiving a short message signal including an actual phone number corresponding to a virtual phone number from the first short message service center, wherein the originating mobile switching center transmits the short message signal using the virtual phone number to the first short message service center, the first short message service center, having received the short message signal, requests routing information for the virtual phone number to the first home location register, the first home location register transmits routing information response signal including a previously stored actual phone number corresponding to the virtual phone number to the first short message service center in response to a signal requesting routing information, and the first short message service center, having received the routing information response signal, transmits the short message signal; means for altering the short message signal; and means for transmitting the altered short message signal to the second short message service center, wherein the second short message service center, having received the altered short message signal, requests routing information for the actual phone number to the second home location register, and the home location register, having received a request for the routing information, transmits the routing information for the actual phone number to the second short message service center, and the second short message service center, having received the routing information, transmits the short message signal to the terminating mobile switching center.

Another aspect of the present invention provides a value added service server for providing a virtual phone number service, the value added service server being associated with a mobile communication network including an originating mobile switching center for managing at least one mobile communication terminal, a terminating mobile switching center, a short message service center, a home location register, the value added service server comprising: means for receiving a short message signal including an actual phone number corresponding to a virtual phone number and a message signal from the short message service center, wherein the originating mobile switching center transmits the short message signal using the virtual phone number to the short message service center, the short message service center, having received the short message signal, requests routing information for the virtual phone number to the home location register, the home location register transmits a routing information response signal including a previously stored actual phone number corresponding to the virtual phone number to the short message service center in response to a routing information signal, and the short message service center, having received the routing information response signal, transmits the short message signal; means for altering the short message signal; and means for transmitting the altered short message signal to the short message service center, wherein the short message service center, having received the altered short message signal, requests routing information for the actual phone number to the home location register, and the home location register, having received a request for the routing information, transmits the routing information for the actual phone number to the short message service center, and the short message service center, having received the routing information, transmits the short message signal to the terminating mobile switching center.

Another aspect of the present invention provides a mobile switching center for managing at least one mobile communication terminal and for providing a virtual phone number service, the mobile switching center being associated with a mobile communication network including a home location register and a subscriber management system, the mobile switching center comprising: means for receiving a voice call for a virtual phone number from an originating terminal; means for requesting routing information of the voice call for the virtual phone number to the home location register; means for receiving a routing information signal from the home location register, wherein the home location register requests information about the virtual phone number to the subscriber management system, the subscriber management system, having received a request signal, determines whether subscription to a virtual phone number service has been made and whether subscription to an additional voice service has been made for the virtual phone number, the routing information signal includes information indicating this when the subscription to a virtual phone number service has been made and the subscription to an additional voice service has not been made; and means for transmitting a message indicating that the voice call can not be made to the originating terminal if the routing information signal includes information indicating that subscription to an additional voice service is not made.

Another aspect of the present invention provides a method of providing a virtual phone number service in a value added service server, the value added service server being associated with a mobile communication network including a terminating mobile switching center for managing at least one mobile communication terminal, a portal gateway switching center, a first short message service center, a second short message service center, a first home location register and a second home location register, the method comprising the steps of: receiving a short message signal including a virtual phone number from the portal gateway switching center; transmitting the short message signal to the first short message service center; receiving the short message signal including information about an actual phone number corresponding to the virtual phone number from the first short message service center, wherein the value added service server transmits the short message signal to the first short message service center, the first short message service center, having received the short message signal, requests routing information for the short message to the first home location register, the first home location register, having received a request for the routing information, transmits a routing response signal including information about an actual phone number corresponding to the virtual phone number to the first short message service center, and the first short message service center, having received the routing response signal, transmits the short message signal including the information about the actual phone number corresponding to the virtual phone number; altering the short message signal; and transmitting the altered short message signal to the second short message service center, wherein the second short message service center, having received the altered short message signal, requests routing information for the actual phone number included in the altered short message to the second home location register, the second home location register, having received a request for the routing information, transmits the routing response signal including the information about the actual phone number to the second short message service center, the second short message service center, having received the routing response signal, the altered short message to the terminating mobile switching center.

In a preferred embodiment, the first home location register may have actual phone number data previously stored corresponding to virtual phone numbers.

Furthermore, the step of altering the short message signal may be performed by indicating that the short message is associated with a virtual phone number service in the short message.

Furthermore, the method may further comprises the step of the second short message service center transmitting status information to the value added service server, and the value added service server, having received the status information, generating accounting information corresponding to the service.

Another aspect of the present invention provides a method of providing a virtual phone number service in a value added service server value, the added service server associated with a mobile communication network including a terminating mobile switching center for managing at least one mobile communication terminal, a portal gateway switching center, a short message service center, and a home location register, the method comprising the steps of: receiving a short message signal including a virtual phone number from the portal gateway switching center; transmitting the received short message signal to the short message service center; receiving the short message signal including information about an actual phone number corresponding to the virtual phone number from the short message service center, wherein the value added service server transmits the short message signal to the short message service center, the short message service center, having received the short message signal, requests routing information for the short message to the home location register, the home location register, having received a request for the routing information, transmits a routing response signal including information about an actual phone number corresponding to the virtual phone number to the short message service center, and the short message service center, having received the routing response signal, transmits the short message signal including the information about the actual phone number corresponding to the virtual phone number; altering the short message signal; and transmitting the altered short message signal to the short message service center, wherein the short message service center, having received the altered short message signal, requests routing information for the actual phone number included in the altered short message to the home location register, the home location register, having received a request for the routing information, transmits the routing response signal including the information about the actual phone number to the short message service center, the short message service center, having received the routing response signal, the altered short message to the terminating mobile switching center.

In a preferred embodiment, the home location register may have actual phone number data previously stored corresponding to virtual phone numbers.

Furthermore, the step of altering the short message signal may be performed by indicating that the short message is associated with a virtual phone number service in the short message.

Furthermore, the method may further comprises the step of the short message service center transmitting status information to the value added service server, and the value added service server, having received the status information, generating accounting information corresponding to the service.

Another aspect of the present invention provides a value added service server for providing a virtual phone number service, the value added service server being associated with a mobile communication network including a terminating mobile switching center for managing at least one mobile communication terminal, a portal gateway switching center, a first short message service center, a second short message service center, a first home location register, and a second home location register, the value added service server comprising: means for receiving a short message signal including a virtual phone number from the portal gateway switching center; means for transmitting the received short message signal to the first short message service center; means for receiving the short message signal including information about an actual phone number corresponding to the virtual phone number from the first short message service center, wherein the value added service server transmits the short message signal to the first short message service center, the first short message service center, having received the short message signal, requests routing information for the short message to the first home location register, the first home location register, having received a request for the routing information, transmits a routing response signal including information about the actual phone number corresponding to the virtual phone number to the first short message service center, and the first short message service center, having received the routing response signal, transmits the short message signal including the information about the actual phone number corresponding to the virtual phone number; means for altering the short message signal; and means for transmitting the altered short message signal to the second short message service center, wherein the second short message service center, having received the altered short message, requests routing information for the actual phone number included in the altered short message to the second home location register, the second home location register, having received a request for the routing information, transmits the routing response signal including the information about the actual phone number to the second short message service center, the second short message service center, having received the routing response signal, the altered short message to the terminating mobile switching center.

Another aspect of the present invention provides a value added service server for providing a virtual phone number service, the value added service server being associated with a mobile communication network including a terminating mobile switching center for managing at least one mobile communication terminal, a portal gateway switching center, a short message service center, and a home location register, the value added service server comprising: means for receiving a short message signal including a virtual phone number from the portal gateway switching center; means for transmitting the received short message signal to the short message service center; means for receiving the short message signal including information about an actual phone number corresponding to the virtual phone number from the short message service center, wherein the value added service server transmits the short message signal to the short message service center, the short message service center, having received the short message signal, requests routing information for the short message to the home location register, the home location register, having received a request for the routing information, transmits a routing response signal including information about an actual phone number corresponding to the virtual phone number to the short message service center, and the short message service center, having received the routing response signal, transmits the short message signal including the information about the actual phone number corresponding to the virtual phone number; means for altering the short message signal; and means for transmitting the altered short message signal to the short message service center, wherein the short message service center, having received the altered short message signal, requests routing information for the actual phone number included in the altered short message to the home location register, the home location register, having received a request for the routing information, transmits the routing response signal including the information about the actual phone number to the short message service center, the short message service center, having received the routing response signal, the altered short message to the terminating mobile switching center.

Another aspect of the present invention provides a method of providing a virtual phone number service in a long message service center, the long message service center being associated with a mobile communication network for managing at least one mobile communication terminal, a mobile gateway associated with the mobile communication network, and a multimedia message service center, the method comprising the steps of: receiving a multimedia message signal including a virtual phone number from the mobile communication network; requesting information about the virtual phone number included in the received multimedia message signal to the mobile gateway; receiving the multimedia message signal including information about an actual phone number from the multimedia message service center, wherein the virtual phone number included in the multimedia message signal from the long message service center is mapped to the actual phone number and the multimedia message signal including the actual phone number is transmitted to the multimedia message service center, the multimedia message service center, having received the multimedia message signal performs predetermined tasks and transmits the multimedia message signal including the actual phone number; altering the multimedia message signal; and means for transmitting the altered multimedia message signal to the mobile communication network.

In a preferred embodiment, the mobile gateway may have actual phone number data previously stored corresponding to virtual phone numbers.

Furthermore, the step of altering the multimedia message signal may be performed by indicating that the multimedia message is associated with a virtual phone number service in the multimedia message.

Furthermore, the mobile communication network may be constructed by combination of at least two different mobile communication service providers.

Another aspect of the present invention provides a method of providing a virtual phone number service in a mobile gateway, the mobile gateway being associated with a mobile communication network for managing at least one mobile communication terminal, a long message service center associated with the mobile communication network, and a multimedia message service center, the method comprising the steps of: receiving a multimedia message signal from the long message service center; mapping a virtual phone number included in the multimedia message signal to a corresponding actual phone number; transmitting the multimedia message signal including the mapped actual phone number to the multimedia message service center, wherein the multimedia message service center, having received the multimedia message signal, transmits the multimedia message signal including the actual phone number to the long message service center, and the long message service center alters the received multimedia message information and transmits it to the mobile communication network.

In a preferred embodiment, the mobile gateway may have actual phone number data previously stored corresponding to virtual phone numbers.

Furthermore, the step of altering the multimedia message signal may be performed by indicating that the multimedia message is associated with a virtual phone number service in the multimedia message.

Furthermore, the mobile communication network may be constructed by combination of at least two different mobile communication service providers.

Another aspect of the present invention provides a long message service center for providing a virtual phone number service, the long message service center being associated with a mobile communication network for managing at least one mobile communication terminal, a mobile gateway associated with the mobile communication network, and a multimedia message service center, the long message service center comprising: means for receiving a multimedia message signal including a virtual phone number from the mobile communication network; means for requesting information about the virtual phone number included in the received multimedia message signal to the mobile gateway; means for receiving the multimedia message signal including information about an actual phone number from the multimedia message service center, wherein the virtual phone number included in the multimedia message signal from the long message service center is mapped to the actual phone number and the multimedia message signal including the actual phone number is transmitted to the multimedia message service center, the multimedia message service center, having received the multimedia message signal performs predetermined tasks and transmits the multimedia message signal including the actual phone number; means for altering the multimedia message signal; and means for transmitting the altered multimedia message signal to the mobile communication network.

Another aspect of the present invention provides a mobile gateway for providing a virtual phone number service, the mobile gateway being associated with a mobile communication network for managing at least one mobile communication terminal, a long message service center associated with the mobile communication network, and a multimedia message service center, the mobile gateway comprising: means for receiving a multimedia message signal from the long message service center; means for mapping a virtual phone number included in the multimedia message signal to a corresponding actual phone number; and means for transmitting the multimedia message signal including the mapped actual phone number to the multimedia message service center, wherein the multimedia message service center, having received the multimedia message signal, transmits the multimedia message signal including the actual phone number to the long message service center, and the long message service center alters the received multimedia message information and transmits it to the mobile communication network.

Advantageous Effects

According to the present invention, a method and apparatus for providing virtual mobile phone numbers for messages, such as short messages, long messages or multimedia messages, which enable phone numbers assigned to general terminals to be used without causing a load on the resources of a mobile communication network, can be provided.

BRIEF DESCRIPTION OF THE DRAWINGS

In order to more fully describe embodiments of the present invention, reference is made to the accompanying drawings.

These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Preferred embodiments of the present invention are described in detail with reference to the accompanying drawings.

First Embodiment

Figure 1:
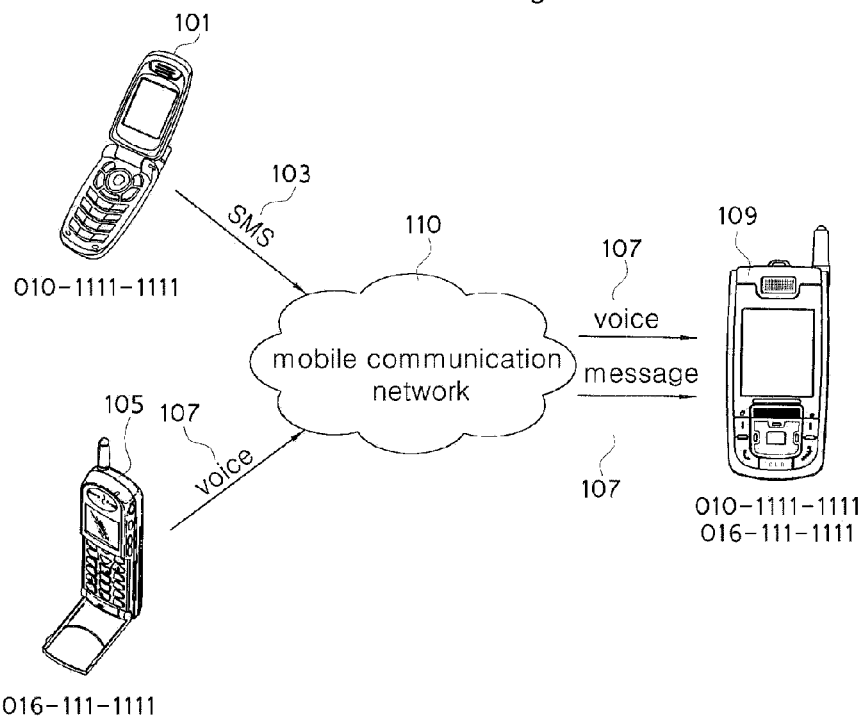
FIG. 1 is a conceptual diagram schematically illustrating a service of providing virtual mobile phone numbers (hereinafter simply referred to as virtual phone numbers) for short messages according to an embodiment of the present invention.

FIG. 1 is a conceptual diagram schematically illustrating a service of providing virtual mobile phone numbers (hereinafter simply referred to as virtual phone numbers) for short messages according to a preferred embodiment of the present invention.

First, the service of providing virtual phone numbers according to the preferred embodiment of the present invention is schematically described below. This service is a service of additionally assigning a virtual phone number to a terminal, to which a specific number has previously been assigned. The assigned virtual phone number is used only for receiving short messages. When a voice call is attempted to the virtual phone number, the voice call is connected to the originally assigned specific number (actual phone number) through a mobile switching center if subscription to an additional voice service has been made, and an appropriate guide announcement is provided to caller if subscription to the additional voice service has not been made.

Referring to FIG. 1, a terminal 109 which has subscribed to such virtual phone number provision service is a terminal which is additionally assigned a virtual phone number 010-1111-1111, in addition to an existing phone number 016-111-1111 which was originally assigned thereto. The virtual phone number assigned through the virtual mobile phone number service can be used only for short message service.

A terminal 105, which attempts a voice call to the service subscriber terminal 109, using the existing originally assigned phone number, can establish the voice call with the service subscriber terminal 109 in an existing manner. Of course, besides the voice call, the transmission of short messages or other services can be provided.

Meanwhile, only short message service 103 can be provided through the virtual phone number 010-1111-1111 which is additionally assigned according to the virtual phone number provision service. As described above, when a voice call to the virtual phone number 010-1111-1111 is attempted, the call is connected to the originally assigned specific number (actual phone number) if subscription to an additional voice service has been made, and an appropriate guide announcement may be provided if subscription to the additional voice service has not been made.

Figure 2:
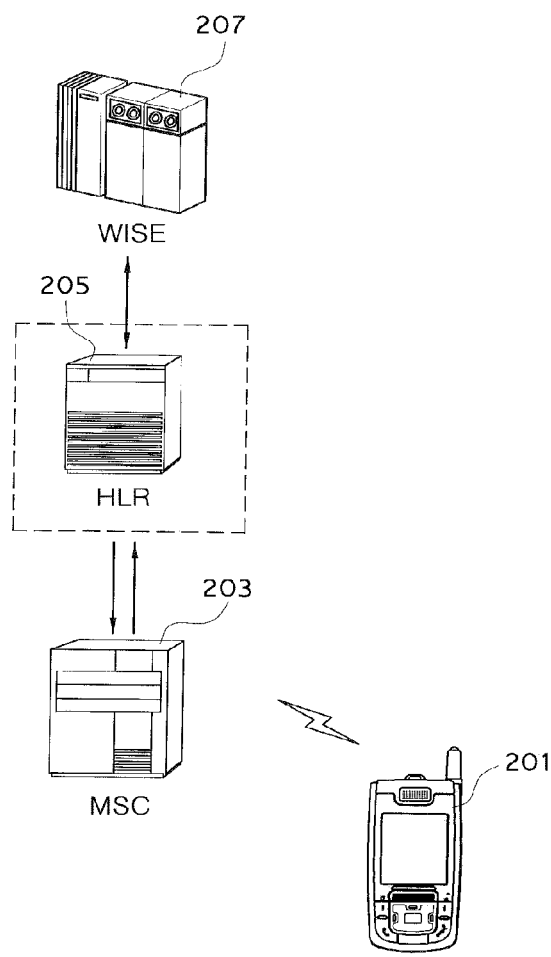
FIG. 2 is a construction diagram illustrating the case in which a voice call is attempted to a virtual phone number.

FIG. 2 is a construction diagram illustrating the case in which a voice call is attempted to a virtual phone number, which relates to the case where the transmission of short messages can be performed and the transmission of voice calls cannot be performed through the virtual phone number, that is, subscription to an additional voice service has not been made.

Referring to FIG. 2, an originating terminal 201 attempts a voice call using a virtual phone number which has been assigned to a terminating terminal. A Mobile Switching Center (MSC) 203, having received a voice call request, requests routing information to a Home Location Register (HLR) 205 based on the virtual phone number. The HLR 205, having received a routing information request, checks basic information and then requests information about the virtual phone number—for example, information about whether subscription to the virtual phone number service has been made, an actual phone number corresponding to the virtual phone number, and whether subscription to an additional voice service has been made—to a subscriber management system (Wireless Information System Environment: WISE) 207, and receives them. Since subscription to an additional voice service has not been made in the case of FIG. 2, the subscriber management system 207 transmits information about the fact that the number requested for the voice call by the originating terminal 201 is a virtual phone number and subscription to the additional voice service has not been made, to the HLR 205. The HLR 205 transmits this information to the MSC 203. The MSC 203 transmits a guide announcement to the originating terminal 201 indicating that the voice call can not be provided.

Figure 3:
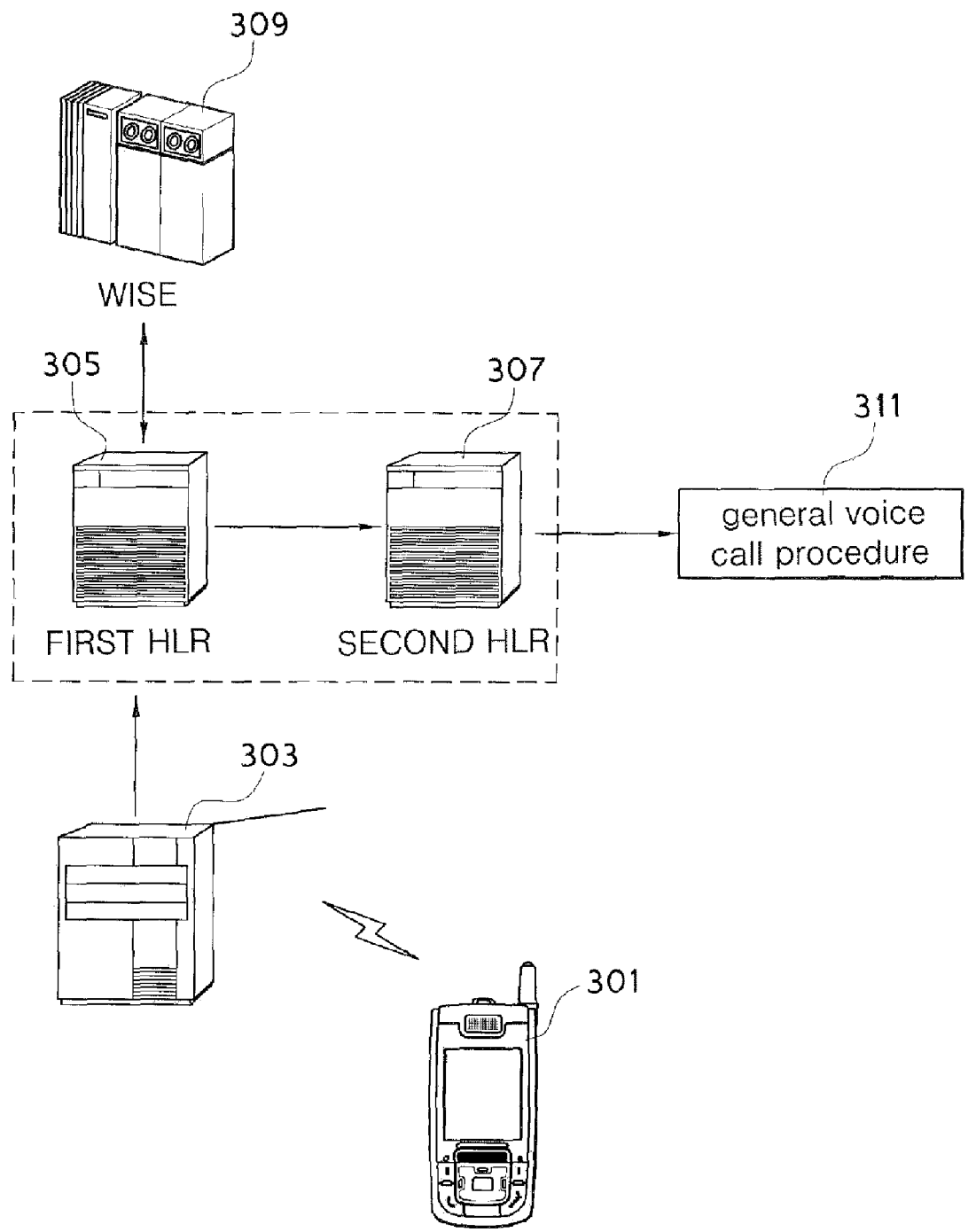
FIG. 3 is a construction diagram illustrating the case in which a voice call is attempted to a virtual phone number.

FIG. 3 is a construction diagram illustrating the case in which a voice call is attempted to a virtual phone number, which relates to the case where the transmission of both short messages and voice calls can be performed through the virtual phone number, that is, subscription to an additional voice service has been made.

Referring to FIG. 3, an originating terminal 301 attempts a voice call to a virtual phone number which has been assigned to a terminating terminal 301. An MSC 303, having received a voice call request, requests routing information to a first HLR 305 based on the virtual phone number. The first HLR 305, having received a routing information request, checks basic information and then requests information about the virtual phone number—for example, information about whether subscription to the virtual phone number service has been made, an actual phone number corresponding to the virtual phone number, and whether subscription to the additional voice service has been made—to a subscriber management system 309, and receives them. Since the subscription to the additional voice service has been made in the case of FIG. 3, the subscriber management system 309 transmits information about an actual phone number, along with information about the fact that the number requested for the voice call by the originating terminal 201 is a virtual phone number and subscription to the additional voice service has been made, to the first HLR 305. Next, the HLR 305 requests the routing information for the actual phone number corresponding to the virtual phone number to a second HLR. The second HLR provides the routing information for the actual phone number, so that the voice call is processed according to a general voice call procedure 311.

Meanwhile, in FIGS. 2 and 3, the HLR 205 may be constructed to include information about the virtual phone number and to act as the subscriber management system.

Figure 4:
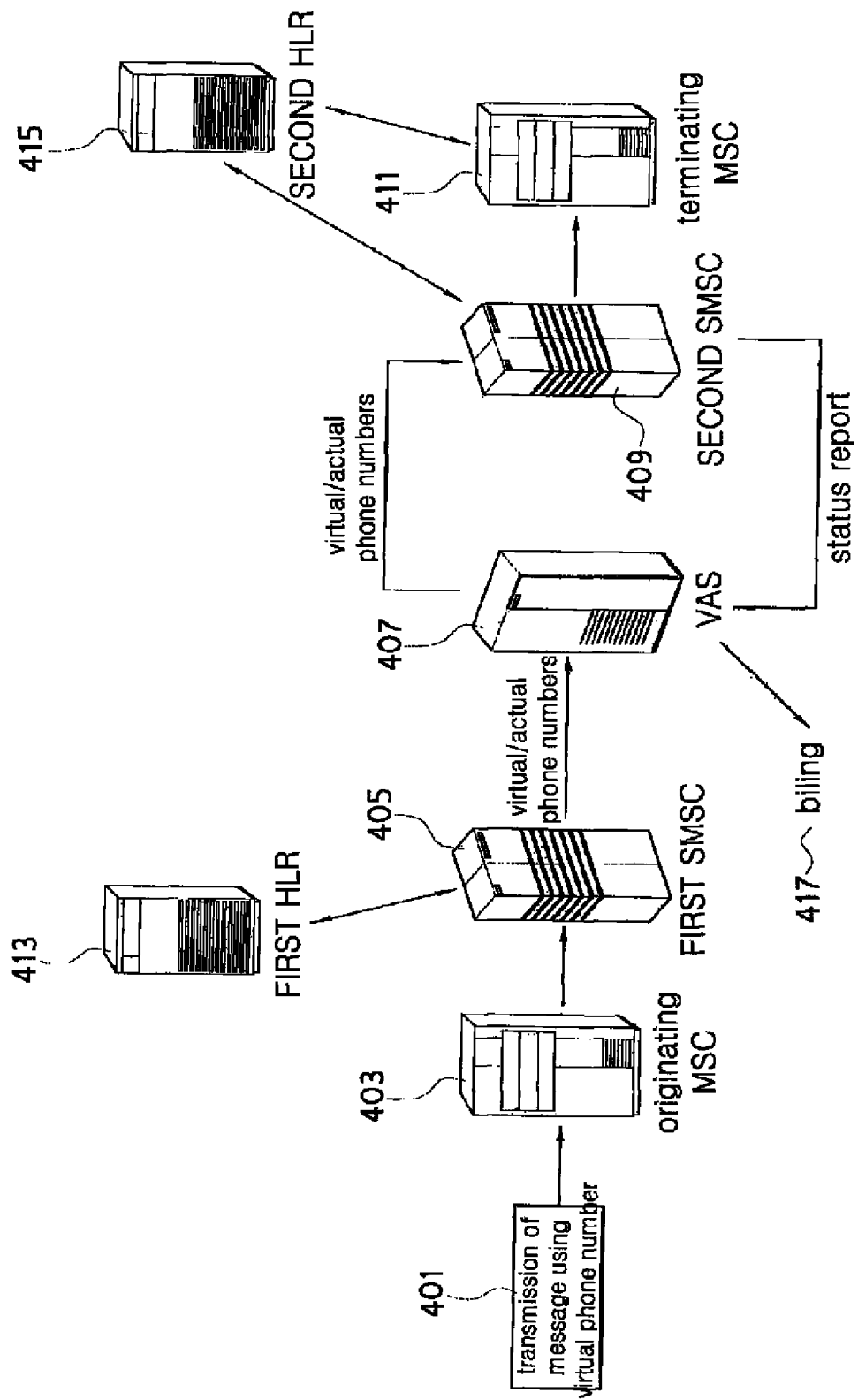
FIG. 4 is a construction diagram illustrating the case in which a short message is transmitted to a virtual phone number according to a preferred embodiment of the present invention.

FIG. 4 is a construction diagram illustrating the case in which a short message is transmitted to a virtual phone number according to a preferred embodiment of the present invention.

Referring to FIG. 4, first, an originating terminal transmits a short message using a virtual phone number assigned to a terminating terminal at step 401. An originating MSC 403 transmits a short message signal including the received short message to a first Short Message Service Center (SMSC) 405.

The first SMSC 405 requests routing information corresponding to the virtual phone number to the first HLR 413. The first HLR 413 transmits the routing information, including the actual phone number corresponding to the virtual phone number, to the first SMSC 405. In this case, the first HLR 413 stores information about the virtual phone number—for example, information about whether subscription to the virtual phone number service has been made, the actual phone number corresponding to the virtual phone number, and whether subscription to additional voice service has been made.

The first SMSC 405 transmits a short message signal, including the actual phone number included in the received routing information and the virtual phone number, to a Value Added Service server (VAS) 407.

The VAS 407 alters the short message signal by adding a message indicating that the short message is associated with the virtual phone number service to the received short message signal, and transmits the altered short message signal to a second SMSC 409. The second SMSC 409, having received the short message signal, requests routing information for the actual phone number, to which the short message is transmitted, to a second HLR 415. The second HLR 415 transmits the routing information for the actual phone number to the second SMSC 409. In this case, the second HLR 415 stores information about the virtual phone number, like the first HLR 413.

The second SMSC 409, having received the routing information, delivers the short message to the terminating terminal corresponding to the actual phone number according to a general short message transmission procedure through a terminating MSC 411.

Figure 5:
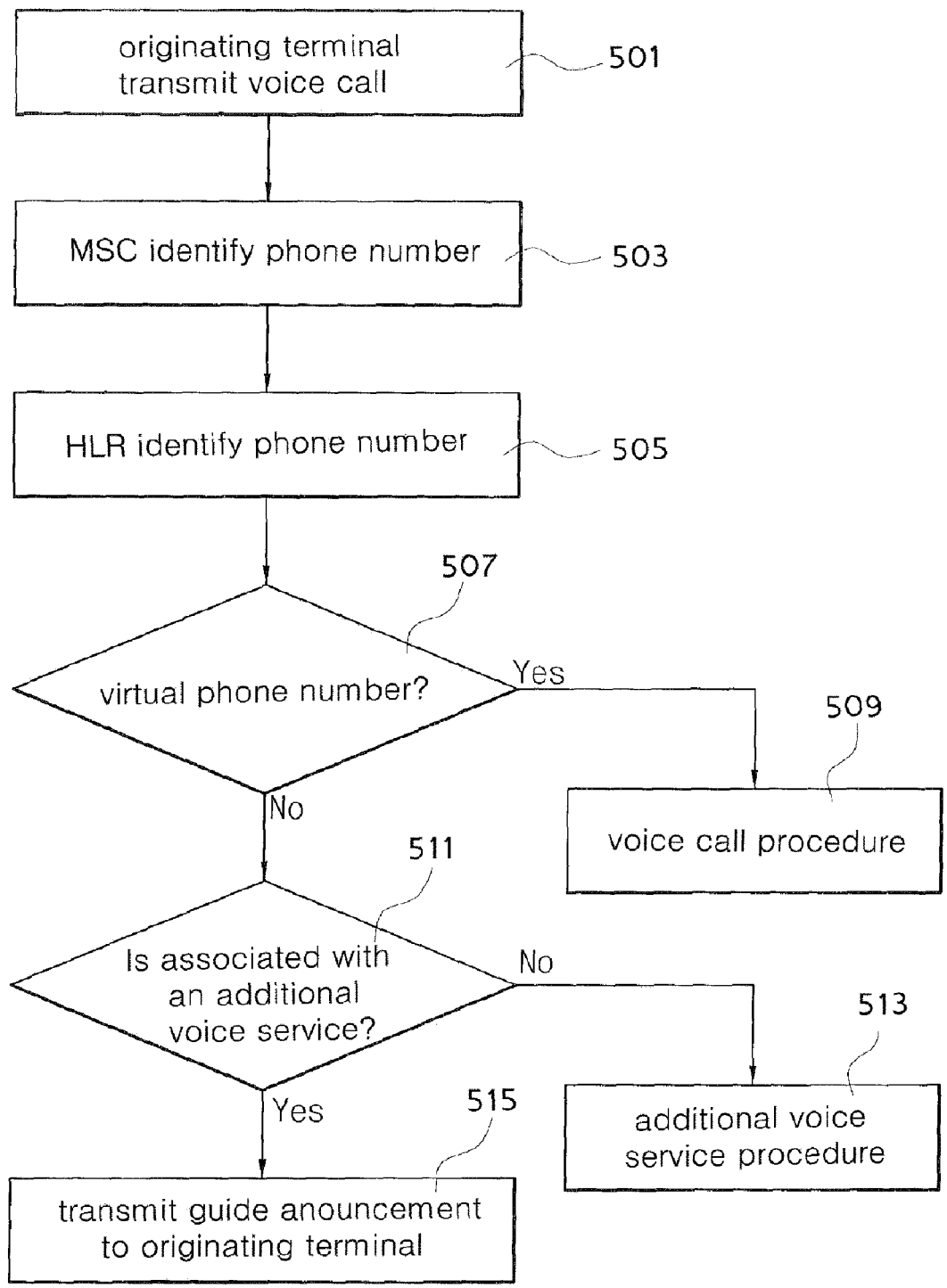
FIG. 5 is a flowchart illustrating the case in which a voice call is requested using a virtual phone number from a terminal which does not subscribe to an additional voice service.

FIG. 5 is a flowchart illustrating the case in which a voice call is requested using a virtual phone number to a terminal which have not subscribed to an additional voice service, as illustrated in FIG. 3.

Referring to FIG. 5, an originating terminal originates a voice call using a virtual phone number previously assigned to a terminating terminal at step 501. An MSC, having received a voice call request from the originating terminal, identifies the phone number of the terminating terminal for which the voice call is requested at step 503, and requests routing information for the voice call to an HLR.

The HLR, having received the routing information request, identifies a phone number at step 505, and determines whether the phone number is associated with a virtual phone number based on a virtual phone number service for short messages at step 507. If the phone number is not a virtual phone number, the voice call is processed as a general voice call at step 509.

If the phone number is a virtual phone number which is associated with subscription to the virtual phone number service, whether the virtual phone number is associated with subscription to an additional voice service is examined at step 511. In this case, whether subscription to the additional voice service has been made may be examined using a VAS, as illustrated in FIG. 3.

When the subscription to the additional voice service has been made, the HLR transmits routing information to an MSC, and processes the voice call according to a general voice call processing procedure at step 513. In this case, routing information for an actual phone number may be provided from a second HLR, as illustrated in FIG. 3.

If subscription to the additional voice service has not been made, the HLR transmits this information to the MSC. The MSC transmits a guide announcement which informs that the voice call can not be provided, to the originating terminal at step 515.

Figure 6:
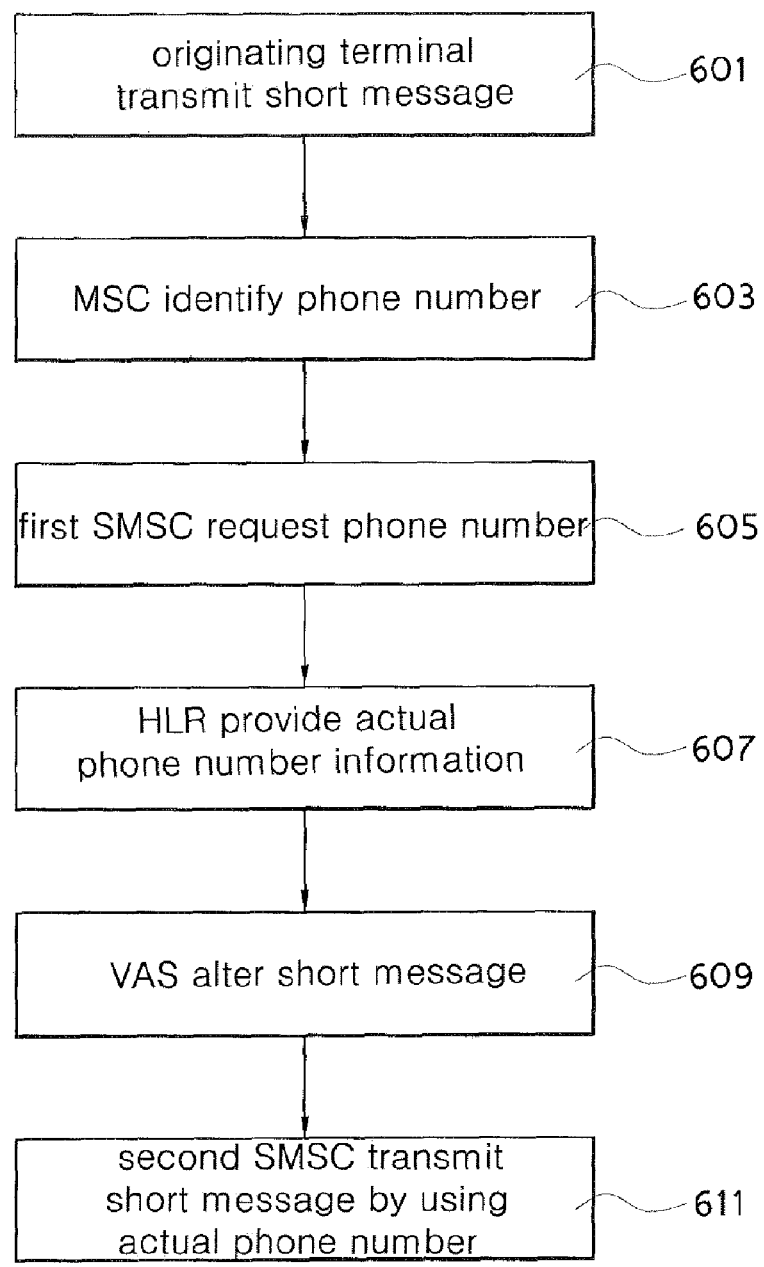
FIG. 6 is a flowchart illustrating a process of transmitting a short message using a virtual phone number according to a preferred embodiment of the present invention.

FIG. 6 is a flowchart illustrating a process of transmitting a short message using a virtual phone number according to a preferred embodiment of the present invention.

Referring to FIG. 6, first, an originating terminal transmits a short message using a virtual phone number previously assigned to a terminating terminal at step 601.

An MSC receives the short message and identifies the virtual phone number for the short message at step 603, and transmits a short message signal including the short message to a first SMSC. The first SMSC requests routing information for the virtual phone number included in the received short message to the HLR at step 605. The HLR, having received a routing information request, determines whether subscription to a virtual phone number service has been made, extracts an actual phone number corresponding to the virtual phone number, and transmits a short message signal including the actual phone number to a VAS at step 607.

The VAS alters the short message signal by adding content indicating that the short message is transmitted to the virtual phone number to the short message signal at step 609. Next, the VAS transmits the altered short message signal to the second SMSC. The second SMSC requests routing information for the actual phone number included in the received short message signal to the second HLR, and transmits the short message to the terminating terminal corresponding to the actual phone number through the MSC based on the received routing information at step 611.

Figure 7:
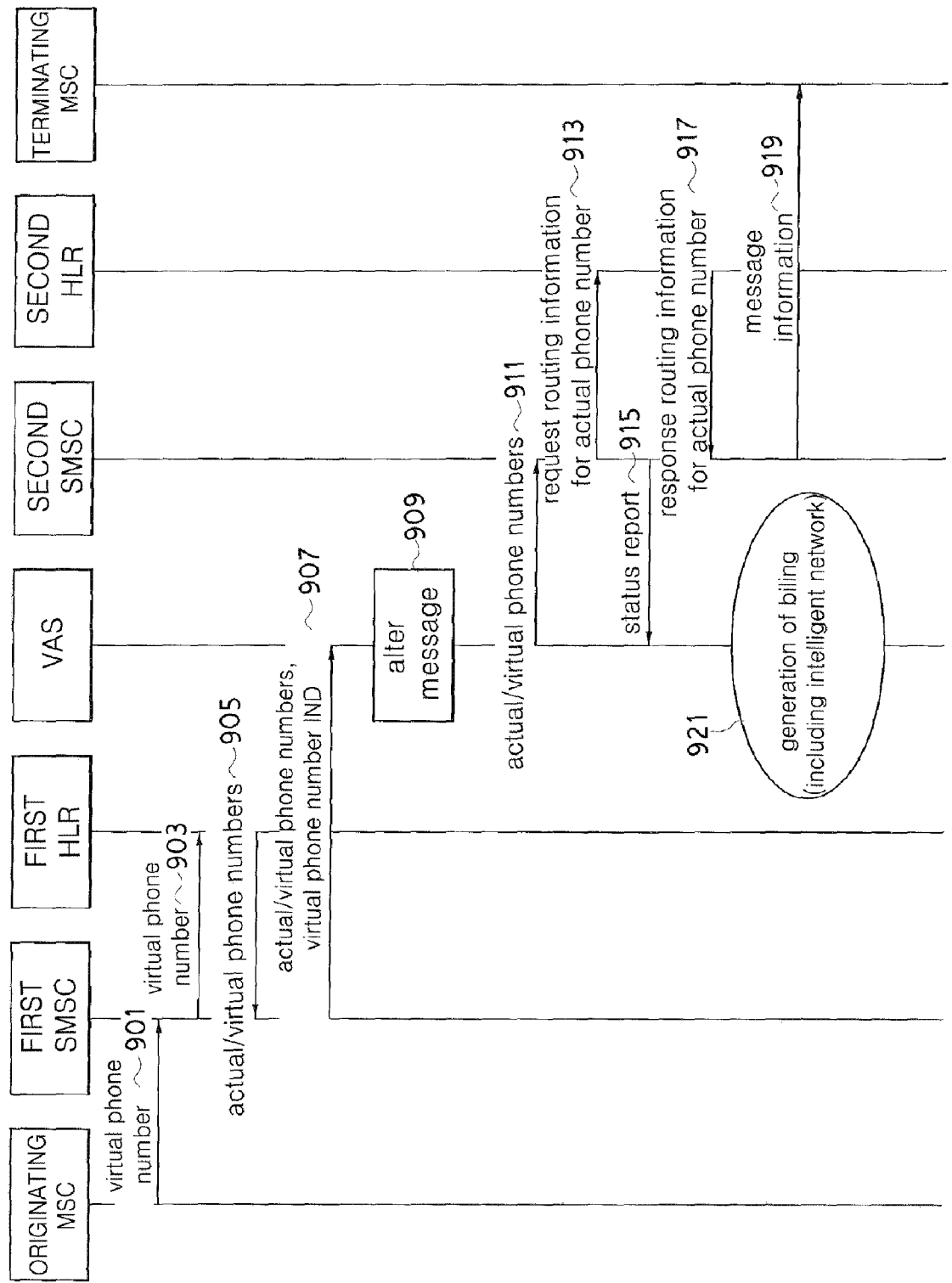
FIG. 7 is a diagram illustrating signal flow in the case in which a short message is transmitted using a virtual phone number according to a preferred embodiment of the present invention.

FIG. 7 is a diagram illustrating signal flow in the case in which a short message is transmitted using a virtual phone number according to a preferred embodiment of the present invention.

Referring to FIG. 7, first, an originating MSC transmits a short message signal, including a virtual phone number transmitted from an originating terminal, to the first SMSC at step 901.

The first SMSC, having received the short message signal, requests routing information for the virtual phone number to the first HLR at step 903. In response to the request, the first HLR transmits a routing response message, including an actual phone number corresponding to the virtual phone number, to the first SMSC at step 905.

The first SMSC, having received the routing response message, transmits the short message signal including information included in the received routing response message to a VAS at step 907. In this case, the short message signal includes at least the short message, the virtual phone number and the actual phone number corresponding to the virtual phone number.

The VAS receives the above-described short message signal, alters the short message included in the received short message signal by indicating that the short message is associated with a virtual phone number service in the content thereof at step 909, and transmits the short message signal including the altered short message to the second SMSC at step 911.

The second SMSC, having received the short message signal, requests routing information for the actual phone number included in the short message signal to the second HLR at step 913. In response to the request, the second HLR transmits a routing response message including the routing information for the actual phone number to the second SMSC at step 917.

Meanwhile, the second SMSC reports status information to the VAS while requesting the routing information for the actual phone number to the second HLR at step 915. The VAS, having received the status information, can perform an additional task, such as biling, based on the status information at step 921.

The second SMSC, having received the routing response message from the second HLR, transmits the short message to a terminating terminal through a terminating MSC based on the routing information included in the routing response message at step 919.

Second Embodiment

Figure 8:
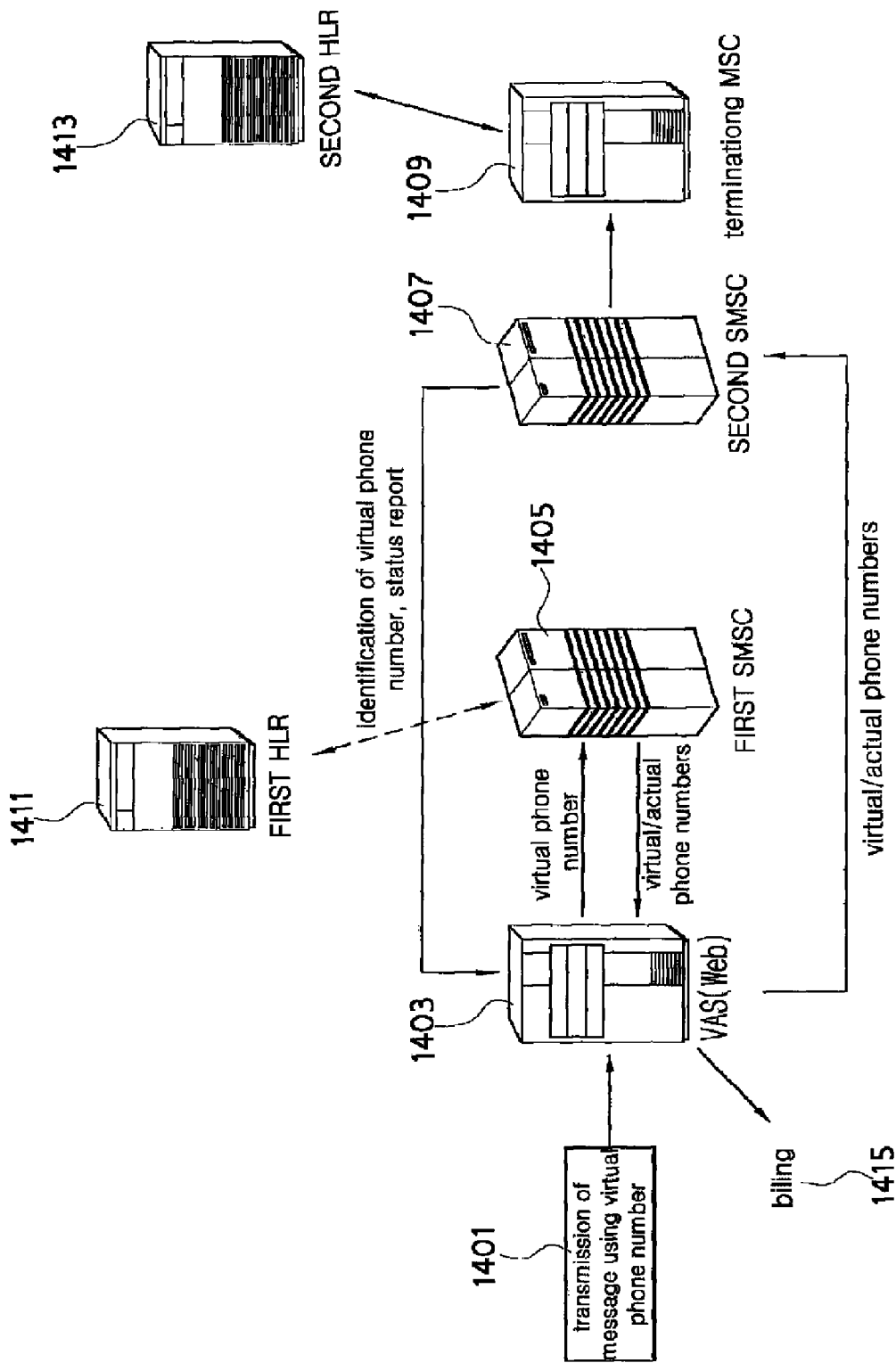
FIG. 8 is a construction diagram illustrating the case in which a short message is transmitted to a virtual phone number, that is, the message is received from a different mobile communication network using a gateway switching center according to another preferred embodiment of the present invention.

FIG. 8 is a construction diagram illustrating the case in which a short message is transmitted to a virtual phone number, that is, the message is received from a different mobile communication network using a portal gateway switching center (PGS) according to another preferred embodiment of the present invention.

Referring to FIG. 8, first, an originating terminal, which belongs to a different mobile communication network, transmits a short message to a terminating terminal using a virtual phone number at step 1401. A short message signal including the short message is transmitted to a VAS 1403 through the portal gateway switching center. The VAS 1403 transmits the received short message signal to a first SMSC 1405.

The first SMSC 1405 requests the routing information for the short message to the virtual phone number to the first HLR 1411. The first HLR 1411 transmits routing response information, including information about whether subscription to a virtual phone number service has been made, and an actual phone number corresponding to the virtual phone number, to the first SMSC 1405. The first SMSC transmits a short message signal including the routing response information to the VAS 1403.

The value added service server 1403 indicates that the short message is associated with the virtual phone number service in the received short message signal, and transmits the altered short message signal to a second SMSC 1407. The SMSC 1407, having received the short message signal, requests routing information for an actual phone number, to which the short message is to be transmitted and corresponding to the virtual phone number, to the second HLR 1413, receives routing response information from the second HLR 1413 and delivers the short message to a terminating terminal corresponding to the actual phone number through a terminating MSC 1409.

Figure 9:
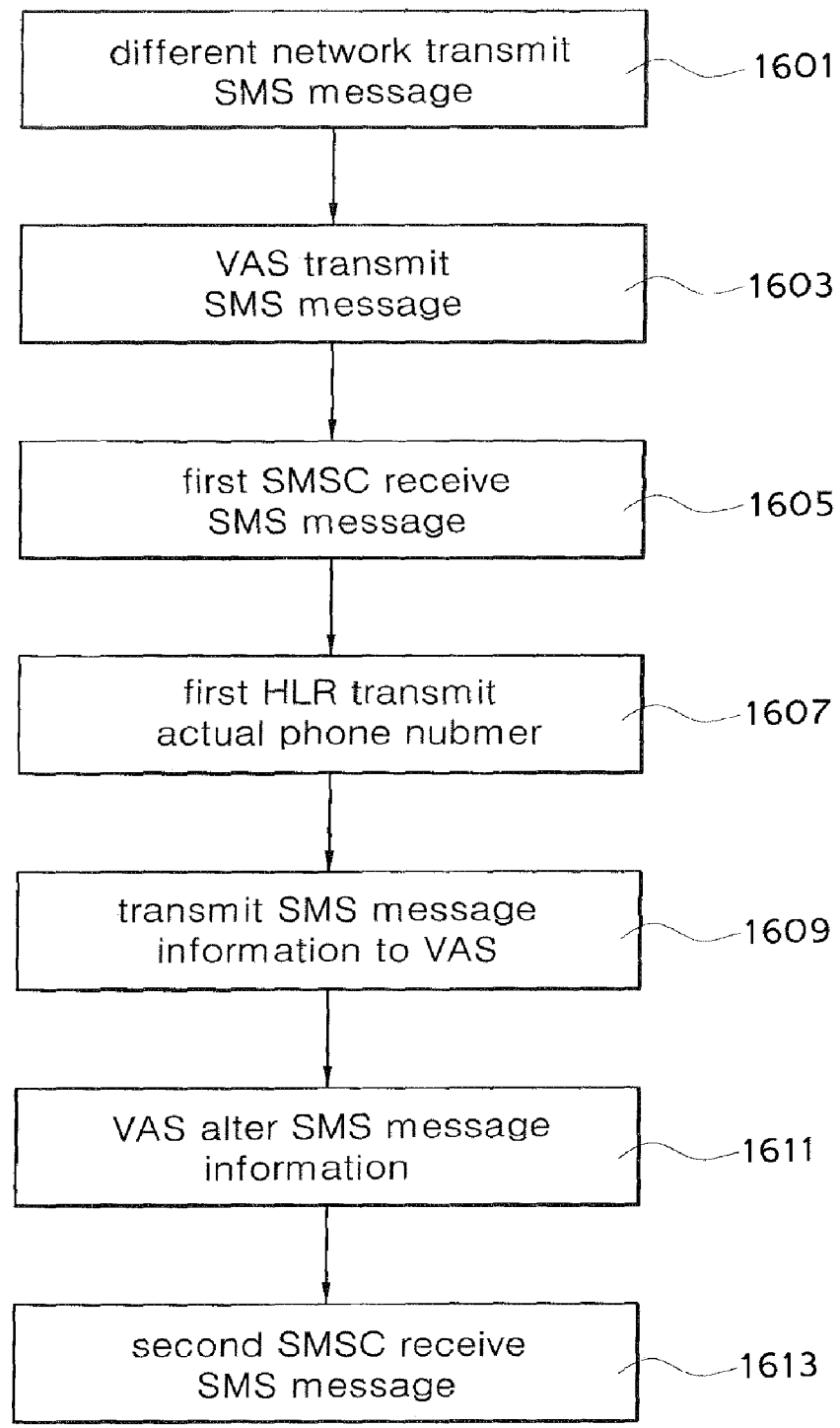
FIG. 9 is a flowchart illustrating a process of transmitting a short message using a virtual phone number according to another preferred embodiment of the present invention.

FIG. 9 is a flowchart illustrating a process of transmitting a short message using a virtual phone number according to another preferred embodiment of the present invention.

Referring to FIG. 9, a short message is transmitted from a different mobile communication network to a virtual phone number assigned to a terminating terminal at step 1601. The short message is transmitted to a VAS through a gateway switching center.

The VAS, having received the short message through the gateway switching center, identifies the phone number of the short message at step 1603, and transmits a short message signal to a first SMSC at step 1605.

The first SMSC requests routing information for the phone number of the short message to the first HLR at step 1607. In response to the request, the first HLR analyzes the virtual phone number of the short message, and transmits the short message including an actual phone number corresponding to the virtual phone number to the VAS at step 1609.

The VAS alters the content of the short message by adding an indication that the short message is transmitted to a virtual phone number to the content at step 1611. Next, the VAS transmits a short message signal including the altered message and the actual phone number to a second SMSC. The second SMSC transmits the altered message to the terminating terminal corresponding to the actual phone number through MSC based on routing response information which is requested to and then received from a second HLR.

Figure 10:
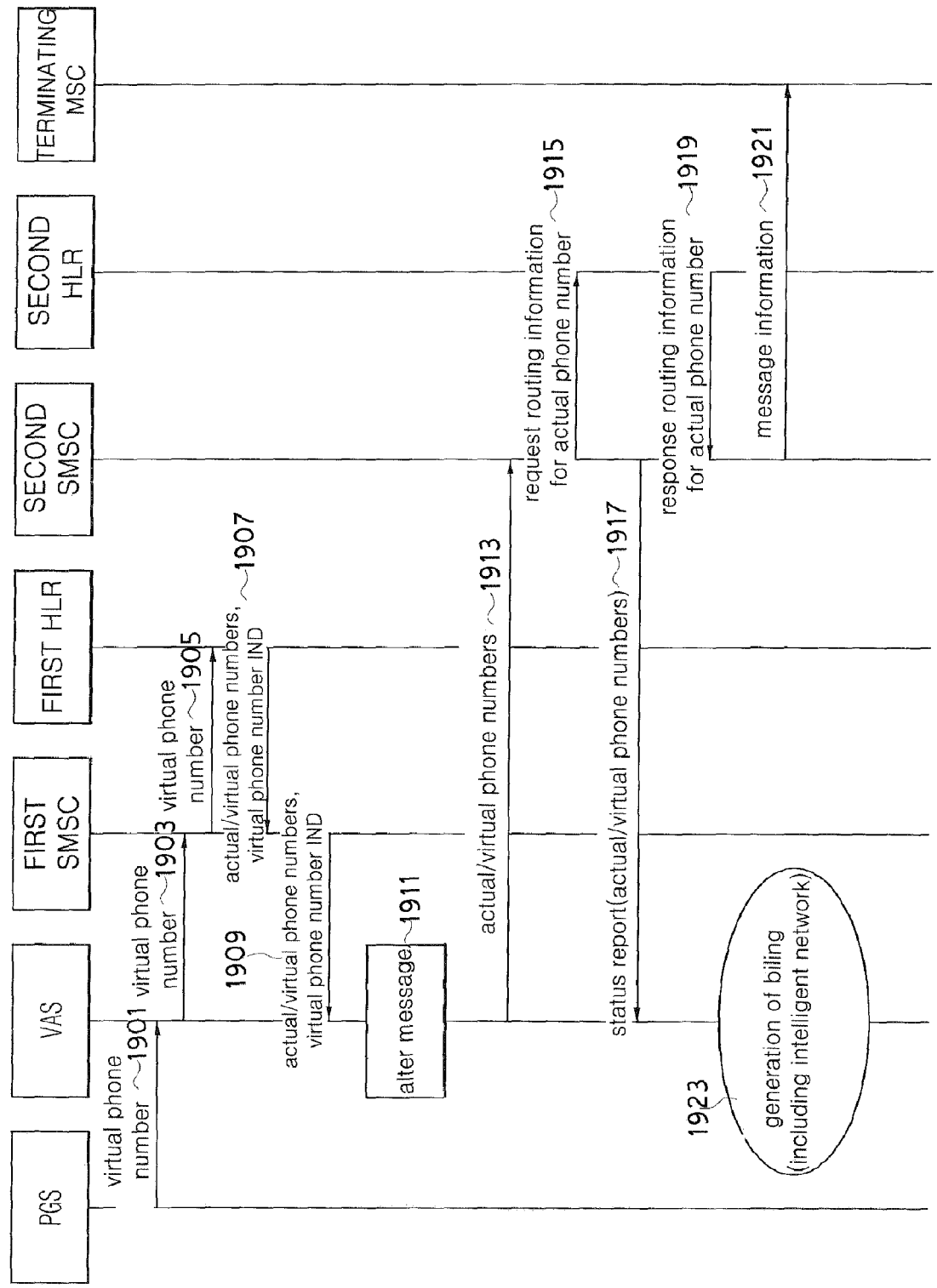
FIG. 10 is a diagram illustrating signal flow in the case in which a short message is transmitted using a virtual phone number according to another preferred embodiment of the present invention.

FIG. 10 is a diagram illustrating signal flow in the case in which a short message is transmitted using a virtual phone number according to another preferred embodiment of the present invention.

Referring to FIG. 10, first, a portal gateway switching center transmits a short message signal including a virtual phone number transmitted from an originating terminal through a different mobile communication network to a VAS at step 1901. The VAS transmits the received short message signal to a first SMSC at step 1903.

The first SMSC, having received the short message signal, requests routing information for the virtual phone number to the first HLR at step 1905. In response to the request, the first HLR transmits a routing response signal, including an actual phone number corresponding to the virtual phone number, to the first SMSC at step 1907.

The first short message service center, having received the routing response signal, transmits the short message signal including information included in the received routing response signal to a VAS at step 1909. In this case, the short message signal includes at least the short message, the virtual phone number and an actual phone number corresponding to the virtual phone number.

The VAS receives the short message signal, alters the content of the short message included in the received short message signal by indicating that the short message is associated with a virtual phone number service in the content at step 1911, and transmits the short message signal including the altered short message to the second SMSC at step 1913.

The second short message service center, having received the short message signal, requests routing information for the actual phone number included in the short message signal to the second HLR at step 1915. In response to the request, the second HLR transmits a routing response message including the routing information for the actual phone number to the second SMSC at step 1919.

Meanwhile, the second SMSC reports status information to the VAS while requesting the routing information for the actual phone number to the second HLR at step 1917. The VAS, having received the status information, can perform additional tasks, such as biling, based on the status information at step 1923.

The second SMSC, having received the routing response message from the second HLR, transmits the short message to a terminating terminal through a terminating MSC based on the routing information included in the routing response message at step 1921.

Third Embodiment

Figure 11:
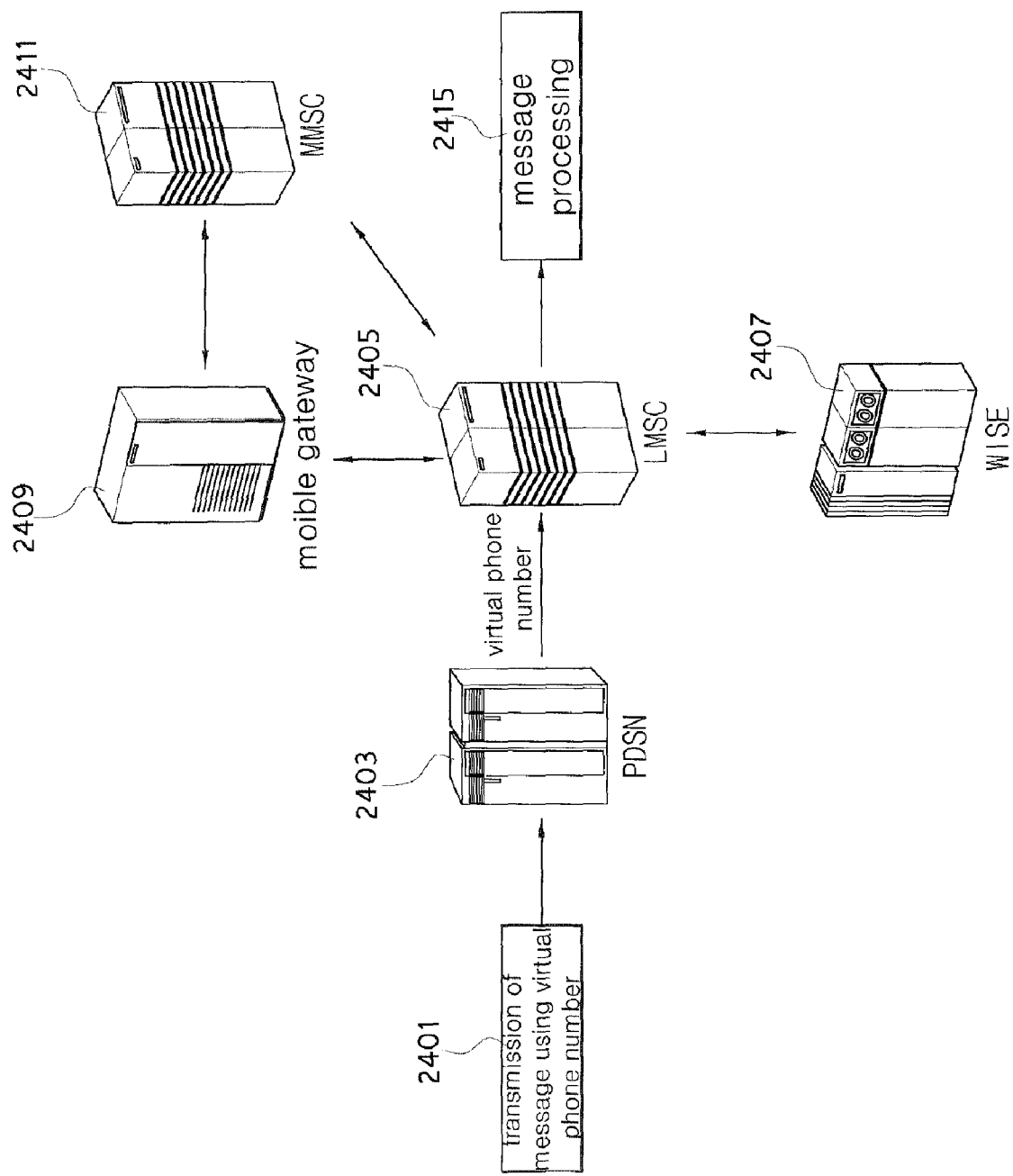
FIG. 11 is a diagram illustrating the construction of a system in the case in which a multimedia message is transmitted to a virtual phone number according to still another preferred embodiment of the present invention.

FIG. 11 is a diagram illustrating the construction of a system in the case in which a multimedia message is transmitted to a virtual phone number according to still another preferred embodiment of the present invention.

Referring to FIG. 11, an originating terminal transmits a multimedia message to a virtual phone number which has previously been assigned to a terminating terminal at step 2401. A multimedia message signal including the multimedia message is transmitted to a Long Message Service Center (LMSC) 2405 through a mobile communication network 2403. The multimedia message signal, having been transmitted to the LMSC, is transmitted to a mobile gateway 2409. The mobile gateway 2409 extracts the virtual phone number included in the received multimedia message signal, maps it to a corresponding actual phone number, and transmits the multimedia message signal including the actual phone number to a Multimedia Message Service Center (MMSC) 2411. The MMSC 2411 generates a multimedia message to be transmitted by performing predetermined tasks including resizing or trans-coding on the multimedia message, and transmits a multimedia message signal including the generated multimedia message to the LMSC 2405.

The LSMC processes the message by indicating that the multimedia message is associated with the virtual phone number in the received multimedia message signal at step 2415 and transmits the multimedia message to the terminating terminal. At the same time, the LMSC 2405 may direct a subscriber management system 2407 to perform a task, such as biling.

Figure 12:
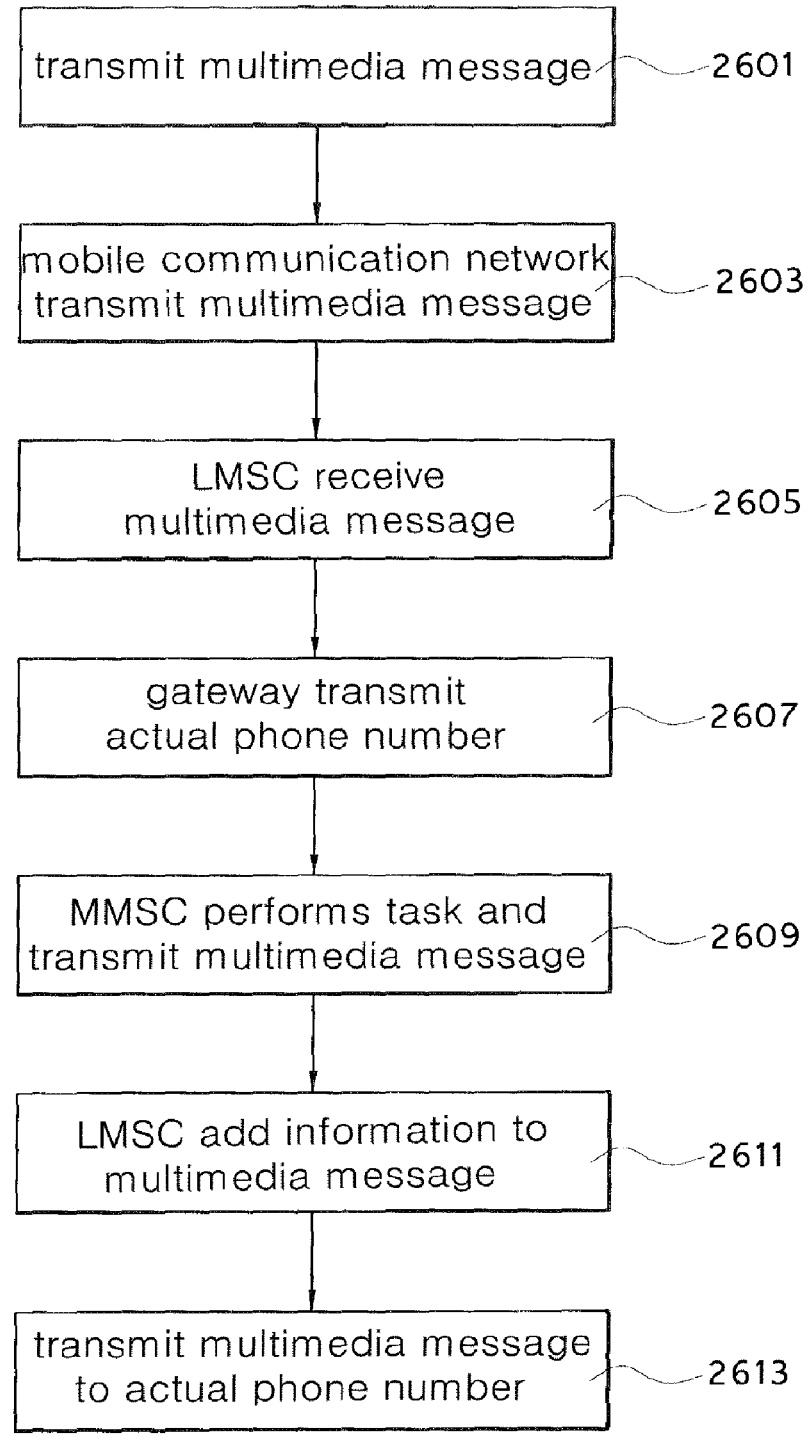
FIG. 12 is a flowchart illustrating a process of transmitting a multimedia message using a virtual phone number according to still another preferred embodiment of the present invention.

FIG. 12 is a flowchart illustrating a process of transmitting a multimedia message using a virtual phone number according to still another preferred embodiment of the present invention.

Referring to FIG. 12, first, an originating terminal transmits a multimedia message to a virtual phone number assigned to a terminating terminal at step 2601. A multimedia message signal including the transmitted multimedia message is received by a LMSC connected to a mobile communication network through the mobile communication network including the originating terminal at step 2605.

The LMSC, having received the multimedia message signal, transmits the multimedia message signal to a mobile gateway. The mobile gateway identifies the virtual phone number, maps it to a previously stored actual phone number corresponding to the virtual phone number, extracts the actual phone number, and transmits the multimedia message signal including the extracted actual phone number to a MMSC at step 2607.

The MMSC performs predetermined tasks including resizing or trans-coding, as described above, on the received multimedia message signal, and transmits the multimedia message signal including the multimedia message resulting from the performance to the LMSC at step 2609. The LMSC, having received the multimedia message signal, adds information about the fact that the multimedia message is being through a virtual phone number, to the multimedia message at step 2611, and transmits the multimedia message to the terminating terminal corresponding to the actual phone number at step 2613.

Figure 13:
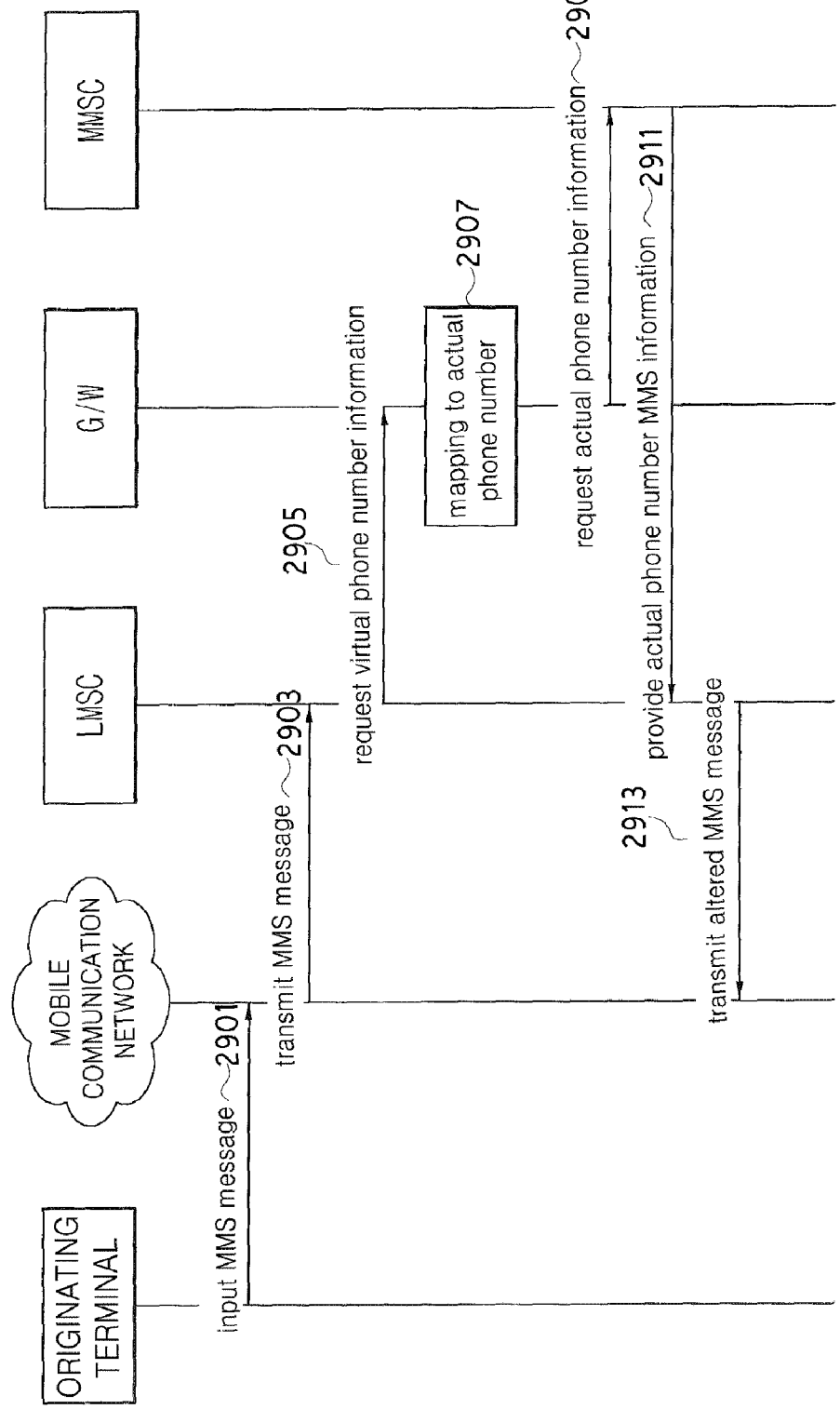
FIG. 13 is a diagram illustrating signal flow in the case in which a multimedia message is transmitted using a virtual phone number according to still another preferred embodiment of the present invention.

FIG. 13 is a diagram illustrating signal flow in the case in which a multimedia message is transmitted using a virtual phone number according to still another preferred embodiment of the present invention.

Referring to FIG. 13, first, when an originating terminal transmits a multimedia message using a virtual phone number previously assigned to a terminating terminal through a mobile communication network at step 2901, a multimedia message signal including the multimedia message is transmitted to a LMSC through the mobile communication network at step 2903.

The LMSC, having received the multimedia message signal, requests information corresponding to the virtual phone number while transmitting the received multimedia message signal to a mobile gateway at step 2905. The mobile gateway analyzes the received multimedia message signal, maps the virtual phone number included in the multimedia message signal to a corresponding actual phone number at step 2907, extracts the mapped actual phone number and transmits the multimedia message signal including it to a MMSC at step 2909.

The MMSC performs predetermined tasks including resizing and trans-coding on the multimedia message signal, and transmits the altered multimedia message signal to the LMSC at step 2911. The LMSC, having received the altered multimedia message signal, indicates that the multimedia message is associated with a virtual phone number service in the altered multimedia message, and transmits the altered multimedia message signal to the mobile communication network at step 2913 and finally to the terminating terminal.

Figure 14:
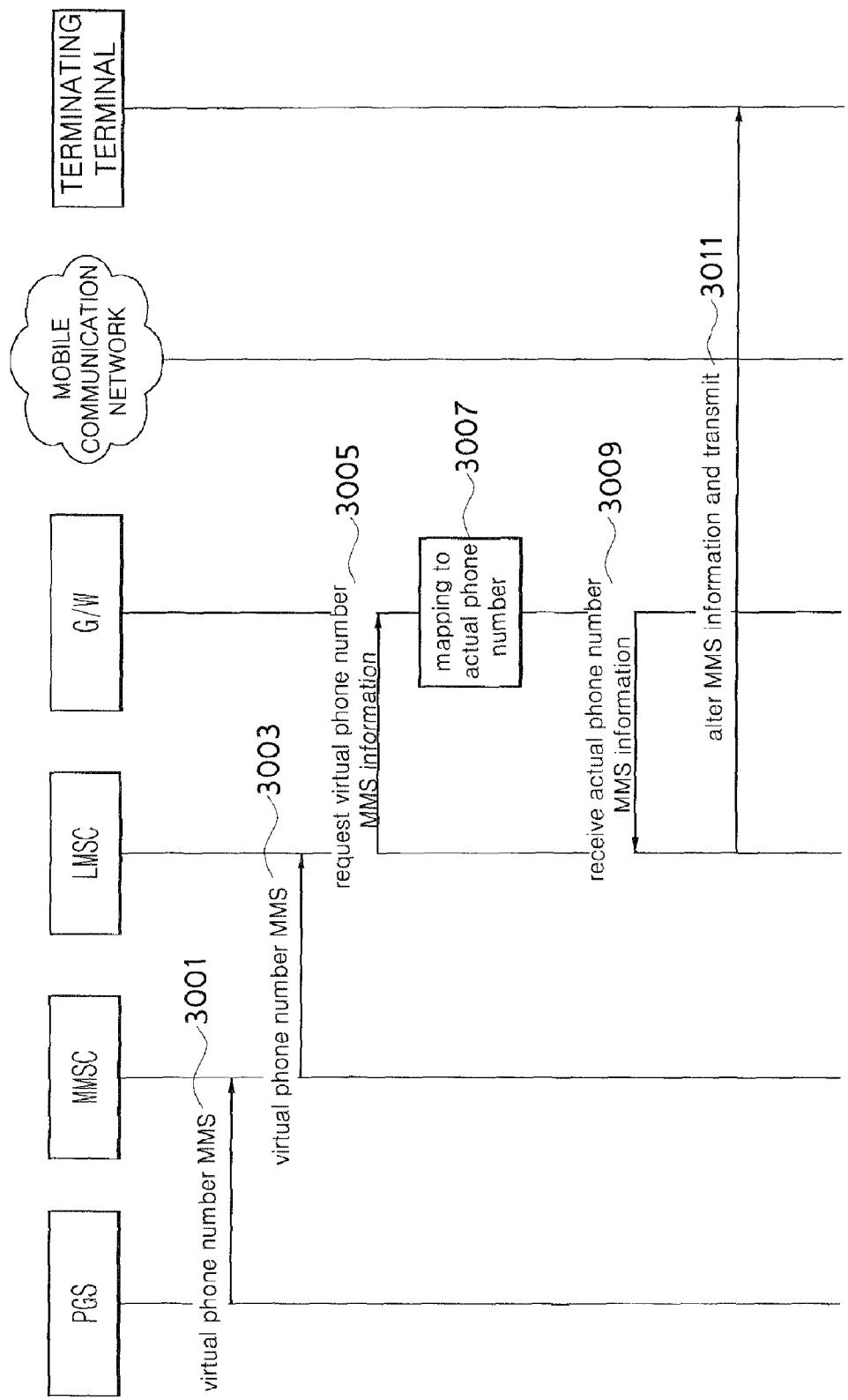
FIG. 14 is a diagram illustrating signal flow in the case in which a multimedia message received through a different mobile communication network through a gateway switching center is transmitted to a virtual phone number according to still another embodiment of the present invention.

FIG. 14 is a diagram illustrating signal flow in the case in which a multimedia message received from a different mobile communication network through a portal gateway switching center is transmitted to a virtual phone number according to still another embodiment of the present invention.

Referring to FIG. 14, first, a multimedia message signal including a multimedia message received through an external network is received by a portal gateway switching center (PGS). The portal gateway switching center transmits the multimedia message signal to a MMSC at step 3001.

The MMSC, having received the multimedia message signal, generates the altered multimedia message signal by performing predetermined tasks including resizing and transcoding on the received multimedia message signal, and transmits it to a LMSC at step 3003.

The LMSC requests information corresponding to a virtual phone number included in the multimedia message signal to a mobile gateway at step 3005. In response to the request, the mobile gateway maps the virtual phone number to a previously stored actual phone number at step 3007, extracts the mapped actual phone number and transmits the multimedia message signal including it to the LMSC at step 3009.

The LMSC, having received the multimedia message signal including the actual phone number, alters the multimedia message by adding indication that the multimedia message is associated with the virtual phone number to the multimedia message, and transmits the altered multimedia message to the terminating terminal of the actual phone number corresponding to the virtual phone number at step 3011.

Although the construction of the present invention has been described with reference to the preferred embodiments of the present invention, the present invention is not limited to the above-described embodiments, and various modifications and variations may be made by those skilled in the art within the scope defined by the accompanying drawings and claims.

For example, the first and second embodiments can be applicable to long messages in addition to short messages.

Furthermore, first and second HLRs and first and second SMSCs are constructed individually according to function, and the first and second SMSCs may be integrated into a single SMSC and the first and second HLRs may be integrated into a single HLR.

Furthermore, although a description of the case in which a voice call is attempted for a virtual phone number has been omitted in the descriptions of the second and third embodiments, a voice call attempt from an originating terminal is processed as described in the first embodiment.

We claim:

1. A method of providing a virtual phone number service in a value added service server, the value added service server being associated with a mobile communication network including a message service center and a home location register, the method comprising the steps of:

receiving a message signal including an actual phone number corresponding to a virtual phone number from the message service center, wherein the message service center receives a message signal transmitted using the virtual phone number from an originating terminal and requests routing information for the virtual phone number to the home location register, the message signal is transmitted from the message service center based on a routing information response signal received from the home location register, the routing information signal including the previously stored actual phone number corresponding to the virtual phone number;

altering the message signal by indicating that the message signal is associated with a virtual phone number service in the message signal; and transmitting the altered message signal to the message service center, wherein the message service center, having received the altered message signal, requests routing information for the actual phone number to the home location register, the home location register, having received a request for the routing information, transmits routing information for the actual phone number to the message service center, and the message service center, having received the routing information, transmits the message signal to a terminating terminal based on the routing information.

2. The method as set forth in claim 1, wherein the home location register has actual phone number data previously stored corresponding to virtual phone numbers.

3. The method as set forth in claim 1, further comprising the step of the message service center transmitting status information to the value added service server, and the value added service server, having received the status information, generating accounting information corresponding to the service.

4. A method of providing a virtual phone number service in a home location register, the home location register being associated with a mobile communication network including a message service center, the method comprising the steps of:

receiving a routing information request for a virtual phone number used in message transmission by an originating terminal from the message service center;

transmitting a routing information response signal including a previously stored actual phone number corresponding to the virtual phone number to a short message service center in response to the routing information request signal;

receiving a routing information request for the actual phone number from the message service center; and transmitting a routing information response signal for the actual phone number to the message service center, wherein the message service center, having received the routing information response signal, transmits the message signal to a terminating terminal using this routing information response signal.

5. A method of providing a virtual phone number service in a message service center, the message service center being associated with a mobile communication network including a home location register and a value added service server, the method comprising the steps of:

receiving a message signal transmitted by an originating terminal using a virtual phone number; transmitting a routing information request for the virtual phone number to the home location register;

receiving a routing information response signal, including a previously stored actual phone number corresponding to the virtual phone number, from the home location register;

transmitting the message signal, including the actual phone number corresponding to the virtual phone number, to the value added service server;

receiving the altered message signal from the value added service server, wherein the altered message signal is altered by indicating that the message signal is associated with a virtual phone number service in the message signal received from the message service center by the value added service server;

transmitting a routing information request for the actual phone number to the home location register;

receiving a routing information response signal for the actual phone number from the home location register; and transmitting the altered message signal to a terminating terminal based on the routing information response signal.

6. A method of providing a virtual phone number service in a value added service server, the value added service server being associated with a mobile communication network including an originating mobile switching center for managing at least one mobile communication terminal, a terminating mobile switching center, a first short message service center, a second short message service center, a first home location register and a second home location register, the method comprising the steps of:

receiving a short message signal including an actual phone number corresponding to a virtual phone number and a message signal from the first short message service center, wherein the originating mobile switching center transmits the short message signal using the virtual phone number to the first short message service center, the first short message service center, having received the short message signal, requests routing information for the virtual phone number to the first home location register, the first home location register transmits a routing information response signal including a previously stored actual phone number corresponding to the virtual phone number in response to the routing information signal to the first short message service center, and the first short message service center, having received the routing information response signal, transmits the short message signal;

altering the short message signal by indicating that the short message signal is associated with a virtual phone number service in the short message signal; and transmitting the altered short message signal to the second short message service center, wherein the second short message service center, having received the altered short message signal, requests routing information for the actual phone number to the second home location register, the second home location register, having received a request for the routing information, transmits the routing information for the actual phone number to the second message service center, and the second message service center, having received the routing information, transmits the short message signal to the terminating mobile switching center based on the routing information.

7. The method as set forth in claim 6, wherein the first home location register has actual phone number data previously stored corresponding to virtual phone numbers.

8. The method as set forth in claim 6, further comprising the step of the second message service center transmitting status information to the value added service server, and the value added service server, having received the status information, generating accounting information corresponding to the service.

9. A method of providing a virtual phone number service in a value added service server, the value added service server being associated with a mobile communication network including an originating mobile switching center for managing at least one mobile communication terminal, a terminating mobile switching center, a short message service center, and a home location register, the method comprising the steps of:

receiving a short message signal including an actual phone number corresponding to a virtual phone number and a message signal from the first short message service center, wherein the originating mobile switching center transmits the short message signal using the virtual phone number to the short message service center, the short message service center, having received the short message signal, requests routing information for the virtual phone number to the home location register, the home location register transmits a routing information response signal including a previously stored actual phone number corresponding to the virtual phone number to the short message service center in response to the routing information signal, and the first short message service center, having received the routing information response signal, transmits the short message signal;

altering the short message signal by indicating that the short message signal is associated with a virtual phone number service in the short message signal; and transmitting the altered short message signal to the short message service center, wherein the message service center, having received the altered short message signal, requests routing information for the actual phone number to the home location register, the home location register, having received a request for the routing information, transmits the routing information for the actual phone number to the message service center, and the short message service center, having receiving the routing information, transmits the short message signal to the terminating mobile switching center.

10. The method as set forth in claim 9, wherein the home location register has actual phone number data previously stored corresponding to virtual phone numbers.

11. The method as set forth in claim 9, further comprising the step of the short message service center transmitting status information to the value added service server, and the value added service server, having received the status information, generating accounting information corresponding to the service.

12. A method of providing a virtual phone number service in a mobile switching center for managing at least one mobile communication terminal, the mobile switching center being associated with a mobile communication network including a home location register and a subscriber management system, the method comprising the steps of:

receiving a voice call for a virtual phone number from an originating terminal;

requesting routing information of the voice call for the virtual phone number to the home location register;

receiving a routing information signal from the home location register, wherein the home location register requests information about the virtual phone number to the subscriber management system, the subscriber management system, having received a request signal, determines whether subscription to a virtual phone number service has been made and whether subscription to an additional voice service has been made for the virtual phone number, the routing information signal includes information indicating this when the subscription to a virtual phone number service has been made and the subscription to an additional voice service has not been made; and transmitting a message indicating that the voice call can not be made to the originating terminal if the routing information signal includes information indicating that subscription to an additional voice service has not been made.

13. A value added service server for providing a virtual phone number service, the value added service server being associated with a mobile communication network including an originating mobile switching center for managing at least one mobile communication terminal, a terminating mobile switching center, a first short message service center, a second short message service center, a first home location register, and a second home location register, the value added service server comprising:

means for receiving a short message signal including an actual phone number corresponding to a virtual phone number from the first short message service center, wherein the originating mobile switching center transmits the short message signal using the virtual phone number to the first short message service center, the first short message service center, having received the short message signal, requests routing information for the virtual phone number to the first home location register, the first home location register transmits routing information response signal including a previously stored actual phone number corresponding to the virtual phone number to the first short message service center in response to a signal requesting routing information, and the first short message service center, having received the routing information response signal, transmits the short message signal;

means for altering the short message signal by indicating that the short message signal is associated with a virtual phone number service in the short message signal; and means for transmitting the altered short message signal to the second short message service center, wherein the second short message service center, having received the altered short message signal, requests routing information for the actual phone number to the second home location register, and the home location register, having received a request for the routing information, transmits the routing information for the actual phone number to the second short message service center, and the second short message service center, having received the routing information, transmits the short message signal to the terminating mobile switching center.

14. A value added service server for providing a virtual phone number service, the value added service server being associated with a mobile communication network including an originating mobile switching center for managing at least one mobile communication terminal, a terminating mobile switching center, a short message service center, a home location register, the value added service server comprising:

means for receiving a short message signal including an actual phone number corresponding to a virtual phone number and a message signal from the short message service center, wherein the originating mobile switching center transmits the short message signal using the virtual phone number to the short message service center, the short message service center, having received the short message signal, requests routing information for the virtual phone number to the home location register, the home location register transmits a routing information response signal including a previously stored actual phone number corresponding to the virtual phone number to the short message service center in response to a routing information signal, and the short message service center, having received the routing information response signal, transmits the short message signal;

means for altering the short message signal by indicating that the short message signal is associated with a virtual phone number service in the short message signal; and means for transmitting the altered short message signal to the short message service center, wherein the short message service center, having received the altered short message signal, requests routing information for the actual phone number to the home location register, and the home location register, having received a request for the routing information, transmits the routing information for the actual phone number to the short message service center, and the short message service center, having received the routing information, transmits the short message signal to the terminating mobile switching center.

15. A mobile switching center for managing at least one mobile communication terminal and for providing a virtual phone number service, the mobile switching center being associated with a mobile communication network including a home location register and a subscriber management system, the mobile switching center comprising:

means for receiving a voice call for a virtual phone number from an originating terminal;

means for requesting routing information of the voice call for the virtual phone number to the home location register;

means for receiving a routing information signal from the home location register, wherein the home location register requests information about the virtual phone number to the subscriber management system, the subscriber management system, having received a request signal, determines whether subscription to a virtual phone number service has been made and whether subscription to an additional voice service has been made for the virtual phone number, the routing information signal includes information indicating this when the subscription to a virtual phone number service has been made and the subscription to an additional voice service has not been made; and means for transmitting a message indicating that the voice call can not be made to the originating terminal if the routing information signal includes information indicating that subscription to an additional voice service is not made.

16. A method of providing a virtual phone number service in a value added service server, the value added service server being associated with a mobile communication network including a terminating mobile switching center for managing at least one mobile communication terminal, a portal gateway switching center, a first short message service center, a second short message service center, a first home location register and a second home location register, the method comprising the steps of:

receiving a short message signal including a virtual phone number from the portal gateway switching center;

transmitting the short message signal to the first short message service center;

receiving the short message signal including information about an actual phone number corresponding to the virtual phone number from the first short message service center, wherein the value added service server transmits the short message signal to the first short message service center, the first short message service center, having received the short message signal, requests routing information for the short message to the first home location register, the first home location register, having received a request for the routing information, transmits a routing response signal including information about an actual phone number corresponding to the virtual phone number to the first short message service center, and the first short message service center, having received the routing response signal, transmits the short message signal including the information about the actual phone number corresponding to the virtual phone number;

altering the short message signal by indicating that the short message signal is associated with a virtual phone number service in the short message signal; and transmitting the altered short message signal to the second short message service center, wherein the second short message service center, having received the altered short message signal, requests routing information for the actual phone number included in the altered short message to the second home location register, the second home location register, having received a request for the routing information, transmits the routing response signal including the information about the actual phone number to the second short message service center, the second short message service center, having received the routing response signal, the altered short message to the terminating mobile switching center.

17. The method as set forth in claim 16, wherein the first home location register has actual phone number data previously stored corresponding to virtual phone numbers.

18. The method as set forth in claim 16, further comprising the step of the second short message service center transmitting status information to the value added service server, and the value added service server, having received the status information, generating accounting information corresponding to the service.

19. A method of providing a virtual phone number service in a value added service server value, the added service server associated with a mobile communication network including a terminating mobile switching center for managing at least one mobile communication terminal, a portal, gateway switching center, a short message service center, and a home location register, the method comprising the steps of:

receiving a short message signal including a virtual phone number from the portal gateway switching center;

transmitting the received short message signal to the short message service center;

receiving the short message signal including information about an actual phone number corresponding to the virtual phone number from the short message service center, wherein the value added service server transmits the short message signal to the short message service center, the short message service center, having received the short message signal, requests routing information for the short message to the home location register, the home location register, having received a request for the routing information, transmits a routing response signal including information about an actual phone number corresponding to the virtual phone number to the short message service center, and the short message service center, having received the routing response signal, transmits the short message signal including the information about the actual phone number corresponding to the virtual phone number;

altering the short message signal by indicating that the short message signal is associated with a virtual phone number service in the short message signal; and transmitting the altered short message signal to the short message service center, wherein the short message service center, having received the altered short message signal, requests routing information for the actual phone number included in the altered short message to the home location register, the home location register, having received a request for the routing information, transmits the routing response signal including the information about the actual phone number to the short message service center, the short message service center, having received the routing response signal, the altered short message to the terminating mobile switching center.

20. The method as set forth in claim 19, wherein the home location register has actual phone number data previously stored corresponding to virtual phone numbers.

21. The method as set forth in claim 19, further comprising the step of the short message service center transmitting status information to the value added service server, and the value added service server, having received the status information, generating accounting information corresponding to the service.

22. A value added service server for providing a virtual phone number service, the value added service server being associated with a mobile communication network including a terminating mobile switching center for managing at least one mobile communication terminal, a portal gateway switching center, a first short message service center, a second short message service center, a first home location register, and a second home location register, the value added service server comprising:

means for receiving a short message signal including a virtual phone number from the portal gateway switching center;

means for transmitting the received short message signal to the first short message service center;

means for receiving the short message signal including information about an actual phone number corresponding to the virtual phone number from the first short message service center, wherein the value added service server transmits the short message signal to the first short message service center, the first short message service center, having received the short message signal, requests routing information for the short message to the first home location register, the first home location register, having received a request for the routing information, transmits a routing response signal including information about the actual phone number corresponding to the virtual phone number to the first short message service center, and the first short message service center, having received the routing response signal, transmits the short message signal including the information about the actual phone number corresponding to the virtual phone number;

means for altering the short message signal by indicating that the short message signal is associated with a virtual phone number service in the short message signal; and means for transmitting the altered short message signal to the second short message service center, wherein the second short message service center, having received the altered short message, requests routing information for the actual phone number included in the altered short message to the second home location register, the second home location register, having received a request for the routing information, transmits the routing response signal including the information about the actual phone number to the second short message service center, the second short message service center, having received the routing response signal, the altered short message to the terminating mobile switching center.

23. A value added service server for providing a virtual phone number service, the value added service server being associated with a mobile communication network including a terminating mobile switching center for managing at least one mobile communication terminal, a portal gateway switching center, a short message service center, and a home location register, the value added service server comprising:

means for receiving a short message signal including a virtual phone number from the portal gateway switching center;

means for transmitting the received short message signal to the short message service center;

means for receiving the short message signal including information about an actual phone number corresponding to the virtual phone number from the short message service center, wherein the value added service server transmits the short message signal to the short message service center, the short message service center, having received the short message signal, requests routing information for the short message to the home location register, the home location register, having received a request for the routing information, transmits a routing response signal including information about an actual phone number corresponding to the virtual phone number to the short message service center, and the short message service center, having received the routing response signal, transmits the short message signal including the information about the actual phone number corresponding to the virtual phone number;

means for altering the short message signal by indicating that the short message signal is associated with a virtual phone number service in the short message signal; and means for transmitting the altered short message signal to the short message service center, wherein the short message service center, having received the altered short message signal, requests routing information for the actual phone number included in the altered short message to the home location register, the home location register, having received a request for the routing information, transmits the routing response signal including the information about the actual phone number to the short message service center, the short message service center, having received the routing response signal, the altered short message to the terminating mobile switching center.

24. A method of providing a virtual phone number service in a long message service center, the long message service center being associated with a mobile communication network for managing at least one mobile communication terminal, a mobile gateway associated with the mobile communication network, and a multimedia message service center, the method comprising the steps of:

receiving a multimedia message signal including a virtual phone number from the mobile communication network;

requesting information about the virtual phone number included in the received multimedia message signal to the mobile gateway;

receiving the multimedia message signal including information about an actual phone number from the multimedia message service center, wherein the virtual phone number included in the multimedia message signal from the long message service center is mapped to the actual phone number and the multimedia message signal including the actual phone number is transmitted to the multimedia message service center, the multimedia message service center, having received the multimedia message signal performs predetermined tasks and transmits the multimedia message signal including the actual phone number;

altering the multimedia message signal by indicating that the multimedia message signal is associated with a virtual phone number service in the multimedia message signal; and transmitting the altered multimedia message signal to the mobile communication network.

25. The method as set forth in claim 24, wherein the mobile gateway has actual phone number data previously stored corresponding to virtual phone numbers.

26. The method as set forth in claim 24, the mobile communication network is constructed by combination of at least two different mobile communication service providers.

27. A method of providing a virtual phone number service in a mobile gateway, the mobile gateway being associated with a mobile communication network for managing at least one mobile communication terminal, a long message service center associated with the mobile communication network, and a multimedia message service center, the method comprising the steps of:

receiving a multimedia message signal from the long message service center;

mapping a virtual phone number included in the multimedia message signal to a corresponding actual phone number;

transmitting the multimedia message signal including the mapped actual phone number to the multimedia message service center, wherein the multimedia message service center, having received the multimedia message signal, transmits the multimedia message signal including the actual phone number to the long message service center, and the long message service center alters the received multimedia message signal by indicating that the multimedia message signal is associated with a virtual phone number service in the multimedia message signal and transmits it to the mobile communication network.

28. The method as set forth in claim 27, wherein the mobile gateway has actual phone number data previously stored corresponding to virtual phone numbers.

29. The method as set forth in claim 27, the mobile communication network is constructed by combination of at least two different mobile communication service providers.

30. A long message service center for providing a virtual phone number service, the long message service center being associated with a mobile communication network for managing at least one mobile communication terminal, a mobile gateway associated with the mobile communication network, and a multimedia message service center, the long message service center comprising:

means for receiving a multimedia message signal including a virtual phone number from the mobile communication network;

means for requesting information about the virtual phone number included in the received multimedia message signal to the mobile gateway;

means for receiving the multimedia message signal including information about an actual phone number from the multimedia message service center, wherein the virtual phone number included in the multimedia message signal from the long message service center is mapped to the actual phone number and the multimedia message signal including the actual phone number is transmitted to the multimedia message service center, the multimedia message service center, having received the multimedia message signal performs predetermined tasks and transmits the multimedia message signal including the actual phone number;

means for altering the multimedia message signal by indicating that the multimedia message signal is associated with a virtual phone number service in the multimedia message signal; and means for transmitting the altered multimedia message signal to the mobile communication network.

31. A mobile gateway for providing a virtual phone number service, the mobile gateway being associated with a mobile communication network for managing at least one mobile communication terminal, a long message service center associated with the mobile communication network, and a multimedia message service center, the mobile gateway comprising:

means for receiving a multimedia message signal from the long message service center;

means for mapping a virtual phone number included in the multimedia message signal to a corresponding actual phone number; and means for transmitting the multimedia message signal including the mapped actual phone number to the multimedia message service center, wherein the multimedia message service center, having received the multimedia message signal, transmits the multimedia message signal including the actual phone number to the long message service center, and the long message service center alters the received multimedia message signal by indicating that the multimedia message signal is associated with a virtual phone number service in the multimedia message signal and transmits it to the mobile communication network.

* * * * *